United States Patent [19]

Tatezono et al.

[11] Patent Number: 5,443,940
[45] Date of Patent: Aug. 22, 1995

[54] OPTICAL RECORDING MATERIAL AND OPTICAL RECORDING MEDIUM EMPLOYING THE SAME

[75] Inventors: Fumio Tatezono; Toshio Harada, both of Moriguchi; Masahiro Irie, Kasuga; Meguru Ohara, Akashi, all of Japan

[73] Assignees: Sanyo Electric Co., Ltd., Osaka; Kobe Natural Products & Chemicals Co., Ltd., Kobe, both of Japan

[21] Appl. No.: 45,785

[22] Filed: Apr. 14, 1993

[30] Foreign Application Priority Data

Apr. 16, 1992 [JP] Japan ............... 4-096504
Jul. 9, 1992 [JP] Japan ............... 4-182623
Sep. 30, 1992 [JP] Japan ............... 4-261701
Mar. 19, 1993 [JP] Japan ............... 5-060591

[51] Int. Cl.⁶ ............................................. G11B 7/24
[52] U.S. Cl. ........................... 430/270; 430/495; 430/19; 430/945; 430/962; 252/586; 548/454; 549/49
[58] Field of Search ............... 430/945, 495, 19, 962, 430/271, 270; 252/586; 548/454, 530, 560; 549/49

[56] References Cited

U.S. PATENT DOCUMENTS

| | | | |
|---|---|---|---|
| 3,715,212 | 2/1973 | Ross | 96/48 |
| 3,918,972 | 11/1975 | Evens et al. | 96/48 |
| 4,780,393 | 10/1988 | Frommeld | 430/292 |
| 4,837,063 | 6/1989 | Irie | 428/64 |
| 4,960,679 | 10/1990 | Nakagiri et al. | 430/335 |
| 5,183,726 | 2/1993 | Taniguchi | 430/342 |

FOREIGN PATENT DOCUMENTS

| | | | |
|---|---|---|---|
| 61-215542 | 9/1961 | Japan . | |
| 3-261782 | 11/1991 | Japan . | |
| 3-261941 | 11/1991 | Japan | 430/19 |
| 3-261947 | 11/1991 | Japan | 430/495 |
| 4-282378 | 10/1992 | Japan . | |

*Primary Examiner*—Charles L. Bowers, Jr.
*Assistant Examiner*—John A. McPherson
*Attorney, Agent, or Firm*—Armstrong, Westerman, Hattori, McLeland & Naughton

[57] ABSTRACT

Disclosed herein is an optical recording material containing a photochromic compound which is expressed in the following general formula (I):

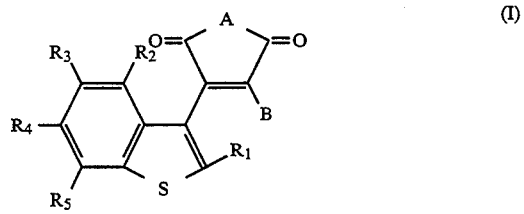

where A represents an oxygen atom or a substituted or unsubstituted nitrogen atom, $R_1$ represents an alkoxy group, $R_2$ to $R_5$ represent substituents such as a hydrogen atom, a halogen atom, a hydroxy group, a substituted or unsubstituted alkyl group and the like respectively, and B represents a substituted or unsubstituted thiophene ring, benzothiophene ring, pyrrole ring or indole ring.

26 Claims, 32 Drawing Sheets

OPTICAL RECORDING MATERIAL AND OPTICAL RECORDING MEDIUM EMPLOYING THE SAME

BACKGROUND OF THE INVENTION

1. Field of the Invention

The present invention relates to a novel optical recording material having high sensitivity, an optical recording medium employing the same, and recording and reproducing methods therefor.

2. Description of the Background Art

In recent years, study has been widely made on an optical recording medium employing a photochromic compound. Upon irradiation with light of a prescribed wavelength, such a photochromic compound is changed in molecular structure by photochemical reaction to cause changes in optical properties such as absorbance, angle of rotation, refractive index and the like. Through such differences caused in the optical properties, it is possible to record and reproduce information in and from the optical recording medium by irradiating the same with light of a specific wavelength, while it is also possible to erase the information by converting the molecular structure of the photochromic compound to the original state again.

In order to apply such a photochromic compound to an optical recording medium, it is necessary to satisfy the following conditions (1) to (5):

(1) thermal stability (stability in preservation of recorded information)
(2) durability against repetition (recording-erasing reloadable frequency)
(3) semiconductor laser sensitivity
(4) high sensitivity (large changes of optical properties in a thin Film state)
(5) durability against repetitive reproduction (reproducible frequency)

Deep study has been made on the condition (1) of thermal stability, which has generally been regarded as the most important subject. A diarylethene derivative having a furan ring and a thiophene ring has been reported as a substance which substantially satisfies practical properties. Also as to the condition (2) of durability against repetition, it has been reported that a diarylethene derivative having a benzothiophene ring or an indole ring can be repeatedly used up to about $10^4$ times under the degassing condition.

Deep study has also been made on the conditions (3) and (5) of semiconductor laser sensitivity and durability against repetitive reproduction, and great effects have been attained in relation to a diarylethene derivative. For example, Bull. Chem. Soc. Jpn. by Uchida, Nakayama and Irie, 63, 1311–1315 (1990) discloses such a photochromic compound of 2,3-bis-(2-methylbenzo[b]-thiophene-3-yl) maleic anhydride which is expressed in the following formula:

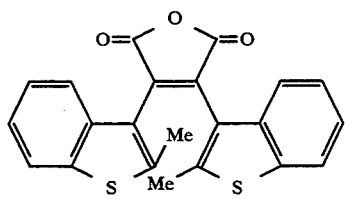

Methods of synthesizing such a photochromic compound are described in Japanese Patent Laying-Open Nos. 63-24245 (1988) and 3-75635 (1991), for example.

However, such a conventional photochromic compound is still insufficient in practice due to a small change of the absorption spectrum in a thin film state.

In application to an optical recording medium, such a photochromic compound must be independently employed or dispersed in a polymer for forming a recording layer. In this case, it is necessary to reduce the thickness of such a recording layer to the minimum, in order to condense a laser beam to a spot diameter of about 1 $\mu$m. If the thickness of the recording layer is insufficiently reduced, the spot diameter of the laser beam is disadvantageously spread in the direction of depth, to cause reduction in recording density.

Therefore, it is necessary to maximize changes of the optical properties of the photochromic compound itself, so that sufficient changes of optical properties can be attained also when the recording layer is reduced in thickness. In recording/reproduction of information, an excellent signal can be obtained as the absolute values of such changes are increased.

It is known that, when the photochromic compound of the aforementioned diarylethene derivative is in a solid state being dispersed in a polymer, its reactivity is reduced as compared with that in a liquid state. It is also known that such a photochromic compound is reduced in reactivity when its concentration is increased in the polymer (Preliminary Reports for the 61st Spring Conference, the Chemical Society of Japan, II2G535, p. 2114). Thus, awaited is a photochromic compound having large absolute values of optical property changes.

The aforementioned photochromic material enters a photostationary state containing molecules of both ring-opening and ring-closure states to be colored red upon irradiation with light of a wavelength near 430 nm, for example, while the same enters a complete ring-opening state upon irradiation with light of a wavelength near 550 nm.

Therefore, it is possible to apply one of such reversibly changed states to a recorded state and the other one to an erased state. Further, it is possible to read information as recorded by irradiating the photochromic material with light of a specific wavelength (550 nm, for example) and detecting differences caused in optical properties such as absorbance between the two states.

However, when the photostationary state is applied to a recorded state and the ring-opening state is applied to an erased state in an optical recording medium containing such a photochromic material, for example, the photochromic material enters a ring-opening state upon irradiation with light of a wavelength near 550 nm for reproduction, to destroy information as recorded. If the optical recording medium is alternatively irradiated with light of a wavelength near 430 nm for reproduction, a portion of an unrecorded state (erased state) disadvantageously enters a photostationary state (recorded state) to cause erroneous recording and destroy the original state. Also when the recorded and erased states are reversed, information as recorded is destroyed in reproduction similarly to the above.

In order to solve such a problem of information destruction caused in reproduction, the inventors have proposed an optical recording medium which is formed by a combination of a specific photochromic material and a polymer (Japanese Patent Application No. 3-312517 (1991)). One of the as-proposed combinations of photochromic materials and polymers is a system of the 2,3-bis(2-methylbenzo[b]thiophene-3-yl) maleic anhydride expressed in the above formula and polymethacrylate. This system has enabled reproduction of information one million times.

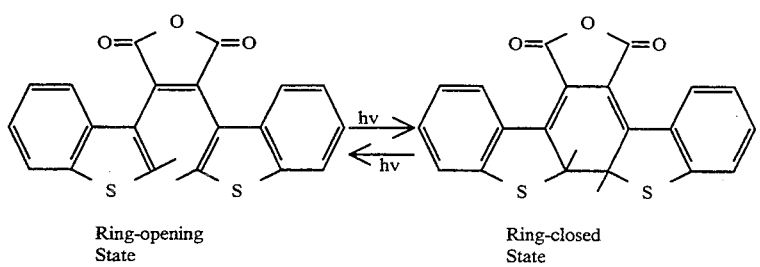

Ring-opening State     Ring-closed State

Another system is a combination of 2-(1,2-dimethyl-3-indolyl)-3-(2,4,5-trimethyl-3-thienyl) maleic anhydride and polyvinyl butyral expressed in the following formula:

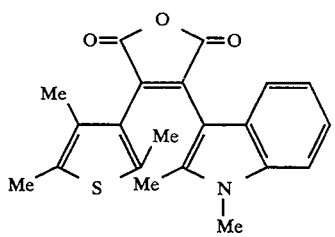

In this system, the reproduction frequency has been improved but only to about $10^2$ to $10^3$ times.

FIG. 42 illustrates absorption spectra of the 2,3-bis(2-methylbenzo[b]thiophene-3-yl) maleic anhydride, and FIG. 43 illustrates absorption spectra of the 2-(1,2-dimethyl-3-indolyl)-3-(2,4,5-trimethyl-3-thienyl) maleic anhydride respectively. Referring to FIG. 42, the broken, solid and dotted lines show absorption spectra of the photochromic material which is in a ring-closure state, a complete ring-opening state upon irradiation with light of 546 nm in wavelength and a photostationary state upon irradiation with light of 436 nm in wavelength respectively. Referring to FIG. 43, on the other hand, the broken, solid and one-dot chain lines show absorption spectra of the photochromic material which is in a complete ring-closure state, a complete ring-opening state and a photostationary state upon irradiation with light of 436 nm in wavelength respectively.

Comparing the absorption spectra of the photochromic materials shown in FIGS. 42 and 43, it is clearly understood that the latter photochromic material is shifted to longer wavelengths by about 50 nm as compared with the former, to have sensitivity also at a wavelength of 670 nm.

Recent study of a semiconductor laser has brought development of a high output semiconductor laser in a wavelength band of 670 nm. Thus, strongly awaited is attainment of nondestructive reading with an optical recording medium employing a photochromic material having high sensitivity in such a longer wavelength band.

In the conventional photochromic compound, further, durability against repetitive recording and erasing, which is 10000 times in a deaired state as described above, is further reduced under presence of air due to strong influence by oxygen. Thus, awaited is a photochromic compound which is excellent in durability against repetitive recording and erasing under presence of air.

SUMMARY OF THE INVENTION

An object of the present invention is to provide a novel optical recording material having extremely larger changes of optical properties following a structural change caused by irradiation with light as compared with the prior art, and an optical recording medium employing the same.

Another object of the present invention is to provide a photochromic material having high sensitivity in a longer wavelength band of 670 nm, and recording and reproducing methods For an optical recording medium, employing such a photochromic material, capable of nondestructive reading.

Still another object of the present invention is to provide an optical recording material employing a photochromic material which is excellent in durability against repetitive recording and erasing under presence of air.

The inventive optical recording material contains a photochromic compound which is expressed in the following general formula (I):

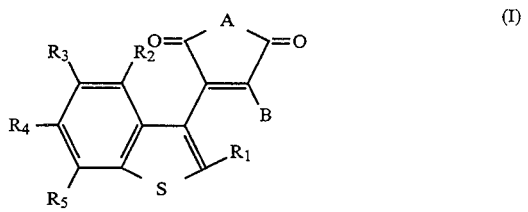

where A represents an oxygen atom or a substituted or unsubstituted nitrogen atom, $R_1$ represents an alkoxy group, $R_2$ to $R_5$ represent atoms or groups selected from a group of a hydrogen atom, a halogen atom, a hydroxy group, a substituted or unsubstituted alkyl group, a substituted or unsubstituted alkoxy group, a cyano group, a nitro group, a substituted or unsubstituted alkylcarbonyl group, a substituted or unsubstituted alkoxycarbonyl group, a perfluoroalkyl group, a substituted or unsubstituted aryl group, a substituted or unsubstituted cycloalkyl group, a substituted or unsubstituted arylcarbonyl group, a substituted or unsubstituted aryloxycarbonyl group, a substituted or unsubstituted mono- or dialkylaminocarbonyl group, a substituted or unsubstituted alkylcarbonyloxy group, a substituted or unsubstituted arylcarbonyloxy group, a substituted or unsubstituted aryloxy group, a substituted or unsubstituted alkoxycarbonyloxy group and a substituted or unsubstituted aryloxycarbonyloxy group respectively, and B represents a substituted or unsubstituted thiophene ring, benzothiophene ring, pyrrole ring or indole ring.

The inventive optical recording medium comprises a recording layer containing an optical recording material containing the photochromic compound expressed in the above general formula (I) and a polymer component, a reflective layer for reflecting light passing through the recording layer, and a substrate for supporting a laminate structure of the recording layer and the reflective layer.

The inventive optical recording material can be contained in the recording layer with the polymer component, as described above. The polymer component may be prepared from an independent polymer, or from a photochromic polymer having the above general formula (I) as a side chain.

According to the present invention, the polymer contained in the recording layer with the optical recording material may be prepared from polystyrene, polycarbonate, polymethyl methacrylate, polyvinyl butyral, a styrene-methyl methacrylate copolymer, or the like.

In the photochromic compound employed in the inventive optical recording material, an alkoxy group is introduced into the second portion of the benzothiophene ring as $R_1$, as expressed in the above general formula (I). It seems that the diarylethene derivative thereby exhibits large changes of optical properties in a thin film state. Such large changes of the optical properties are conceivably caused by a large absorption coefficient of the compound and/or a high conversion yield to closed-ring form.

The photochromic compound contained in the inventive optical recording material exhibits a sufficiently larger change of transmittance as compared with a conventional photochromic compound. Therefore, it is possible to obtain an excellent signal in recording/reproduction of information by introducing the inventive optical recording material into a recording layer of an optical recording medium.

An optical recording material according to a first aspect of the present invention contains a photochromic compound which is expressed in the following general formula (II):

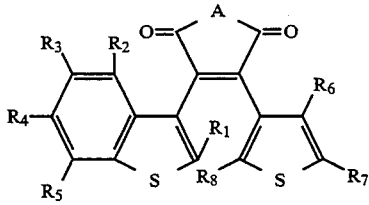

(II)

where A represents an oxygen atom or a substituted or unsubstituted nitrogen atom, $R_1$ represents an alkoxy group, and $R_2$ to $R_8$ represent atoms or groups selected from a group of a hydrogen atom, a halogen atom, a hydroxy group, a substituted or unsubstituted alkyl group, a substituted or unsubstituted alkoxy group, a cyano group, a nitro group, a substituted or unsubstituted alkylcarbonyl group, a substituted or unsubstituted alkoxycarbonyl group, a perfluoroalkyl group, a substituted or unsubstituted aryl group, a substituted or unsubstituted cycloalkyl group, a substituted or unsubstituted arylcarbonyl group, a substituted or unsubstituted aryloxycarbonyl group, a substituted or unsubstituted mono- or dialkylaminocarbonyl group, a substituted or unsubstituted alkylcarbonyloxy group, a substituted or unsubstituted arylcarbonyloxy group, a substituted or unsubstituted aryloxy group, a substituted or unsubstituted alkoxycarbonyloxy group and a substituted or unsubstituted aryloxycarbonyloxy group respectively, while $R_6$ and $R_7$ may form parts of a benzene ring to constitute a benzothiophene ring.

Examples of the photochromic compound according to the First aspect of the present invention are as Follows:

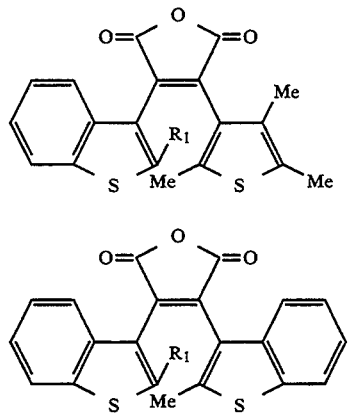

In the optical recording material according to the first aspect of the present invention, a compound having a cyano group as $R_7$ in the above general formula (II) is particularly excellent in durability against repetitive coloring and decoloring, i.e., durability against repetitive recording/reproduction under presence of air. This is conceivably because electron density in the thiophene ring is reduced due to introduction of the cyano group, which is an electron attractive substituent, to evade attack of excited oxygen. An example of such a photochromic compound is expressed in the following general formula:

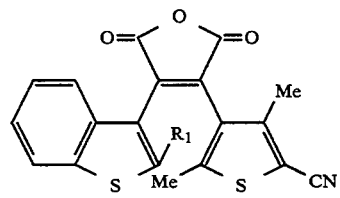

An optical recording material according to a second aspect of the present invention contains photochromic compound which is expressed in the following general formula (III):

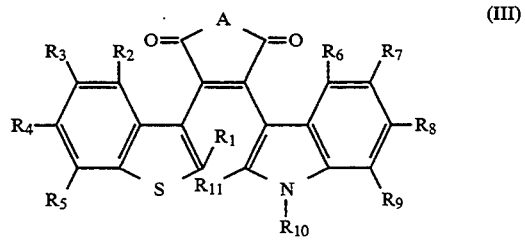

(III)

where A represents an oxygen atom or a substituted or unsubstituted nitrogen atom, $R_1$ represents an alkoxy group, and $R_2$ to $R_{11}$ represent atoms or groups selected from a group of a hydrogen atom, a halogen atom, a hydroxy group, a substituted or unsubstituted alkyl group, a substituted or unsubstituted alkoxy group, a cyano group, a nitro group, a substituted or unsubstituted alkylcarbonyl group, a substituted or unsubstituted alkoxycarbonyl group, a perfluoroalkyl group, a substituted or unsubstituted aryl group, a substituted or unsubstituted cycloalkyl group, a substituted or unsubstituted arylcarbonyl group, a substituted or unsubstituted aryloxycarbonyl group, a substituted or unsubstituted mono- or dialkylaminocarbonyl group, a substituted or unsubstituted alkylcarbonyloxy group, a substituted or unsubstituted arylcarbonyloxy group, a substituted or unsubstituted aryloxy group, a substituted or unsubstituted alkoxycarbonyloxy group and a substituted or unsubstituted aryloxycarbonyloxy group respectively. This photochromic material may be bonded with a polymer as a side chain in the position of A or N of N—$R_{10}$ in the above formula.

As to the photochromic compound according to the second aspect of the present invention, the following compounds are employed in Examples:

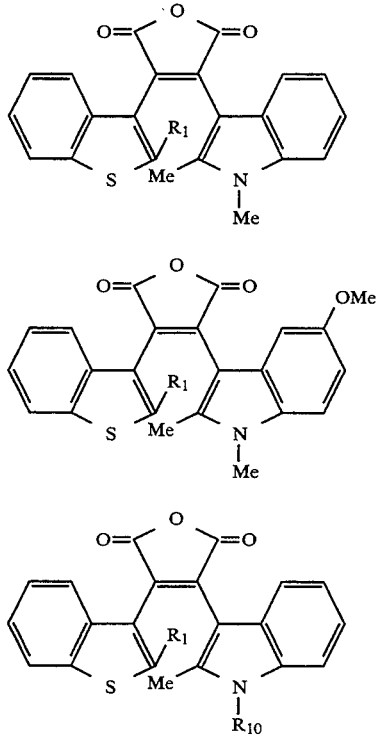

($R_{10} = C_nH_{2n+1}$, $n \geq 4$)

In order to form a recording layer using an optical recording material containing the photochromic compound according to the second aspect of the present invention, the photochromic compound and a polymer can be mixed/dissolved in an organic solvent, to prepare a thin film by spin coating or the like. In this case, it is necessary to prepare a mixed solution of high concentration in order to form a recording layer of high concentration, i.e., a film containing the photochromic compound in a high ratio to the polymer, while it is necessary to improve solubility with respect to the organic solvent for preparing such a mixed solution of high concentration. In order to improve solubility with respect to the organic solvent, an alkyl group having a carbon number of at least 4 is preferably employed as $R_{10}$ in the above general formula (III).

When such a long-chain alkyl group is introduced into the position of $R_{10}$, it is possible to improve compatibility with solvent molecules contained in the solution and relieve intermolecular force, thereby improving solubility as the result. It is also possible to improve compatibility with the polymer similarly to the above, thereby improving molecular dispersibility of the photochromic compound in the polymer. Since the essential optical properties of the photochromic compound are not much influenced by such introduction of a substituent into the first position of the indole ring (position of —N—), i.e., the position of $R_{10}$, the long-chain alkyl group is preferably introduced into this position.

On the other hand, it is possible to improve durability against repetitive coloring/decoloring under presence of air by employing an alkoxy group having a carbon number of at least 2 as $R_1$ in the above general formula (III). This is conceivably because attack of excited oxygen which is caused by light irradiation can be inhibited by the introduction of the alkoxy group having a carbon number of at least 2. In other words, it may be possible to inhibit attack of excited oxygen by introducing such a bulky substituent into the second position, which is most easily attacked by such excited oxygen, due to steric hindrance.

A recording method for an optical recording medium according to the present invention comprises a step of heating a recording layer containing a photochromic compound expressed in the above general formula (III), and a step of irradiating the heated recording layer with light of a specific wavelength.

In the inventive recording method, the recording layer may be heated by irradiation with light of a specific wavelength. Alternatively, the recording layer may be heated by irradiation with light which is different from that of the specific wavelength.

A reproducing method for an optical recording medium according to the present invention comprises a step of selectively heating a recording layer which is in a colored state, and a step of reproducing recorded and unrecorded states by detecting reproducing light passing through the recording layer.

In order to selectively heat a portion of the recording layer being in a colored state, there is a method of irradiating the recording layer with light of a wavelength which is absorbed only by the portion of the recording layer being in a colored state.

Further, it is possible to maintain the colored state of the recording layer by irradiating the heated portion thereof with reproducing light, thereby enabling nondestructive reading.

It is possible to form such an optical recording layer that a photostationary state which is attained upon irradiation with light of a specific wavelength is varied with temperatures, by employing the optical recording material according to the second aspect of the present invention. Since this optical recording material has sensitivity in a longer wavelength band, it is possible to record/reproduce information with a high output semiconductor laser in a 670 nm wavelength band.

When such an optical recording material is employed, it is possible to form a recording layer whose photostationary state is varied with temperatures, whereby it is possible to heat the recording layer containing the optical recording material for recording/reproducing information in/from only a heated portion thereof. Thus, it is possible to record/reproduce information in high density by heating only a small region of the recording layer and recording/reproducing the information in/from the heated portion, for example.

When a colored state of the recording layer is applied to a recorded state, it is possible to heat only a recorded portion of the recording layer by irradiating the recording layer with light which is absorbed only by a colored portion thereof in reproduction. In this state, the recording layer is so irradiated with reproducing light that the colored state thereof is maintained by such irradiation with the reproducing light, thereby enabling nondestructive reading.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 45 illustrates a repeatable frequency of coloring/decoloring in a photochromic compound according to Example 10 of the present invention;

DESCRIPTION OF THE PREFERRED EMBODIMENTS

Figure 1:
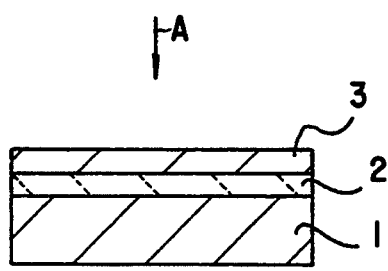
FIG. 1 is a sectional view showing an example of an optical recording medium according to the present invention.

FIG. 1 illustrates an example of an optical recording medium according to the present invention. Referring to FIG. 1, a reflective layer 2 is provided on a substrate 1. A recording layer 3 containing a photochromic compound according to the present invention and a polymer is provided on the reflective layer 2. This recording medium is irradiated with light from above along arrow A, so that the light passing through the recording layer 3 is reflected by the reflective layer 2 to again pass through the recording layer 3.

Figure 2:
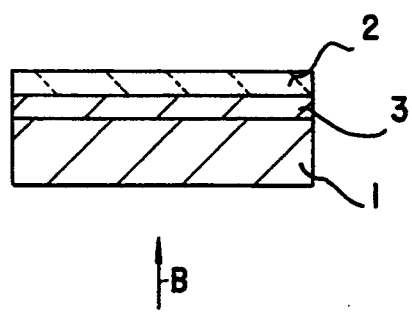
FIG. 2 is a sectional view showing another example of the optical recording medium according to the present invention.

FIG. 2 is a sectional view showing another example of an optical recording medium according to the present invention. Referring to FIG. 2, a recording layer 3 is provided on a substrate 1, and a reflective layer 2 is provided on the recording layer 3. This optical recording medium is irradiated with light along arrow B, so that the light passes through the substrate 1 and enters the recording layer 3. The light passing through the recording layer 3 is reflected by the reflective layer 2, to again pass through the recording layer 3 and the substrate 1.

Figure 3:
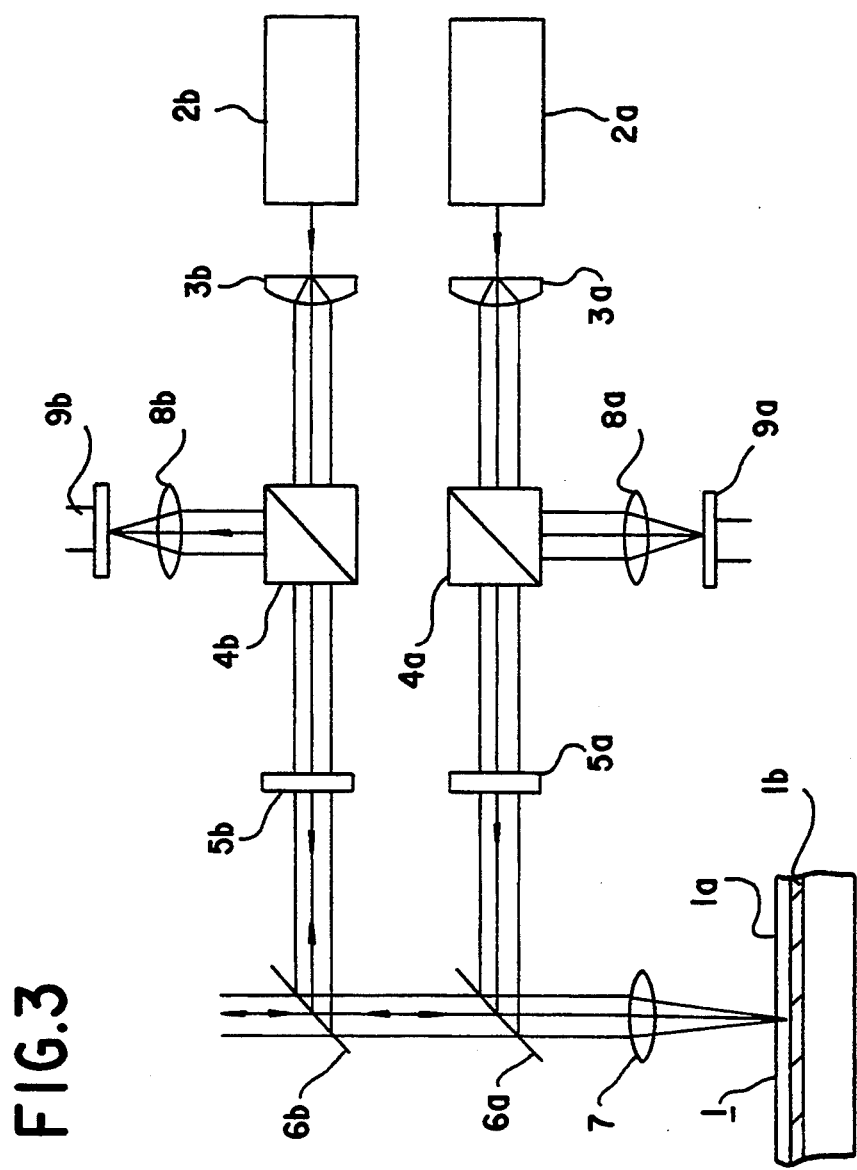
FIG. 3 is a model diagram showing an example of an optical system for evaluating durability against repetitive reproduction.

FIG. 3 schematically illustrates an exemplary optical system for evaluating durability against repetitive reproduction. Referring to FIG. 3, this optical system is provided with an Ar laser unit 2a for outputting a linearly polarized pulse laser beam of 458 nm in wavelength, and an He-Ne laser unit 2b for outputting a linearly polarized pulse laser beam of 633 nm in wavelength as laser output units.

The laser beam outputted from the Ar laser unit 2a is converted to a parallel beam by a collimator lens 3a, transmitted through a polarized beam splitter 4a as P-polarized light, and thereafter converted to circularly polarized light by a quarter-wave plate 5a. Then the laser beam is totally reflected by a dichroic mirror 6a, and condensed on a recording layer 1a of an optical recording medium 1 through an objective lens 7. The laser beam condensed on the recording layer 1a is reflected by a reflective layer 1b to be transmitted through the objective lens 7 again, and reflected by the dichroic mirror 6a, which reflects only light of 458 nm in wavelength. Thereafter the laser beam is again converted to linearly polarized light by the quarter-wave plate 5a, incident upon the polarized beam splitter 4a as S-polarized light, and thereafter received in a photosensor 9a through a lens 8a. When the optical recording medium 1 is irradiated with the beam of 458 nm in wavelength, therefore, reflectance of this optical recording medium 1 is measured by the photosensor 9a.

On the other hand, the laser beam outputted from the He—Ne laser unit 2b is converted to a parallel beam by a collimator lens 3b, transmitted through a polarized beam splitter 4b as P-polarized light, and thereafter converted to circularly polarized light by a quarter-wave plate 5b. Thereafter the laser beam is totally reflected by a dichroic mirror 6b, then transmitted through the dichroic mirror 6a, and condensed on the recording layer 1a of the optical recording medium 1 through the objective lens 7, similarly to the above. The laser beam condensed on the recording layer 1a is reflected by the reflective layer 1b to be transmitted through the objective lens 7 and the dichroic mirror 6a again, and reflected by the dichroic mirror 6b, which reflects only light of 633 nm in wavelength. Thereafter the laser beam is again converted to linearly polarized light by the quarter-wave plate 5b, incident upon the polarized beam splitter 4b as S-polarized light, and received in a photosensor 9b through a lens 8b. When the optical recording medium 1 is irradiated with the beam of 633 nm in wavelength, therefore, reflectance of this optical recording medium 1 is measured by the photosensor 9b.

The present invention is now described in more concrete terms with reference to Examples.

EXAMPLE 1

2-(2-methoxy-3-benzo[b]thienyl)-3-(2-methyl-3-benzo[b]thienyl) maleic anhydride was prepared as a photochromic compound forming an optical recording material according to the first aspect of the present invention. This compound has the following structural formula:

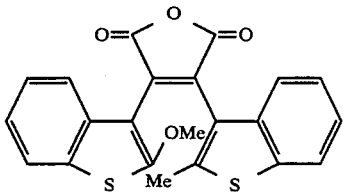

This compound can be prepared by the following synthesizing method, for example:

(1) Preparation of 2-(2-methoxy-3-benzo[b]thienyl)-3(2-methyl-3-benzo[b]thienyl) Maleic Anhydride 0.82 g (5.0 mmol) of 2-methoxybenzo[b]thiophene and 50 ml of methylene chloride were introduced into a three neck flask of 200 ml in capacity which was provided with a thermometer, a cerum cap and an anhydrous calcium chloride tube, and 0.42 ml of oxalyl chloride was added dropwise thereto with an injector under the room temperature, and the mixture was stirred as such at the room temperature for four days. Then the solvent was recovered at a temperature of 30° C. under reduced pressure, and yellow-white crystals as obtained were dissolved in 70 ml of methylene chloride and stirred with addition of 1.01 g (10.0 mmol) of triethylamine and 1.03 g (5.0 mmol) of 3-methylbenzo[b]thienyl acetate at the room temperature for three hours. After the solvent was distilled away under reduced pressure, silica gel column chromatography was done on the residue, to collect and concentrate fractions containing the target. The as-obtained residue was crystallized with diethylether and n-hexane and dried under reduced pressure, to obtain 200 mg of 2-(2-methoxy-3-benzo[b]thienyl)-3-(2-methyl-3-benzo[b]thienyl) maleic anhydride in a 9.8% yield.

(2) Analytical Values $^1$H-NMR (CDCl$_3$): 2.28 (s, 3H), 3.59 (s, 3H), 7.1 to 7.8 (m, 8H): Measurement Condition of 300 MHz IR: 1840 cm$^{-1}$ (C=O), 1770 cm$^{-1}$ (C=O)

EXAMPLE 2

2-(2-methoxy-3-benzo[b]thienyl)-3-(2,4,5-trimethyl-3-thienyl) maleic anhydride was prepared as a photochromic compound contained in the optical recording material according to the first aspect of the present invention. This compound has the following structural formula:

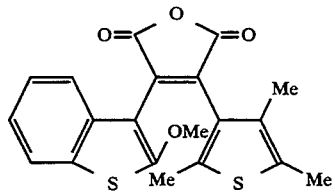

This compound can be prepared by the following synthesizing method, for example:

(1) Preparation of 2-(2-methoxy-3-benzo[b]thienyl)-3-(2,4,5-trimethyl-3-thienyl) Maleic Anhydride 2.7 g (16.5 mmol) of 2-methoxybenzo[b]thiophene and 160 ml of methylene chloride were introduced into a three neck flask of 500 ml in capacity which was provided with a thermometer, a cerum cap and an anhydrous calcium chloride tube, and 1.4 ml of oxalyl chloride was added dropwise thereto with an injector under the room temperature, and this mixture was stirred as such at the room temperature for two days. Then the solvent was recovered at a temperature of 30° C. under reduced pressure, and yellow-white crystals as obtained were dissolved in 160 ml of methylene chloride and stirred with addition of 3.33 g (33.0 mmol) of triethylamine and 3.03 g (16.5 mmol) of 2,4,5-trimethyl-3-thienyl acetate at the room temperature for two days. After the solvent was distilled away under reduced pressure, silica gel column chromatography was done on the residue to collect and concentrate fractions containing the target. The as-obtained residue was crystallized with diisopropylether, washed five times with diisopropylether and thereafter dried under reduced pressure, to obtain 203 mg of 2-(2-methoxy-3-benzo[b]thienyl)-3-(2,4,5-trimethyl-3-thienyl) maleic anhydride in a 3.2% yield.

(2) Analytical Values $^1$H-NMR (CDCl$_3$): 1.88 (s, 3H), 1.97 (s, 3H), 2.2 (m, 3H), 3.73 (s, 3H), 7.0 to 7.7 (m, 4H): Measurement Condition of 300 MHz IR: 1840 cm$^{-1}$ (C=O), 1770 cm$^{-1}$ (C=O)

Figure 4:
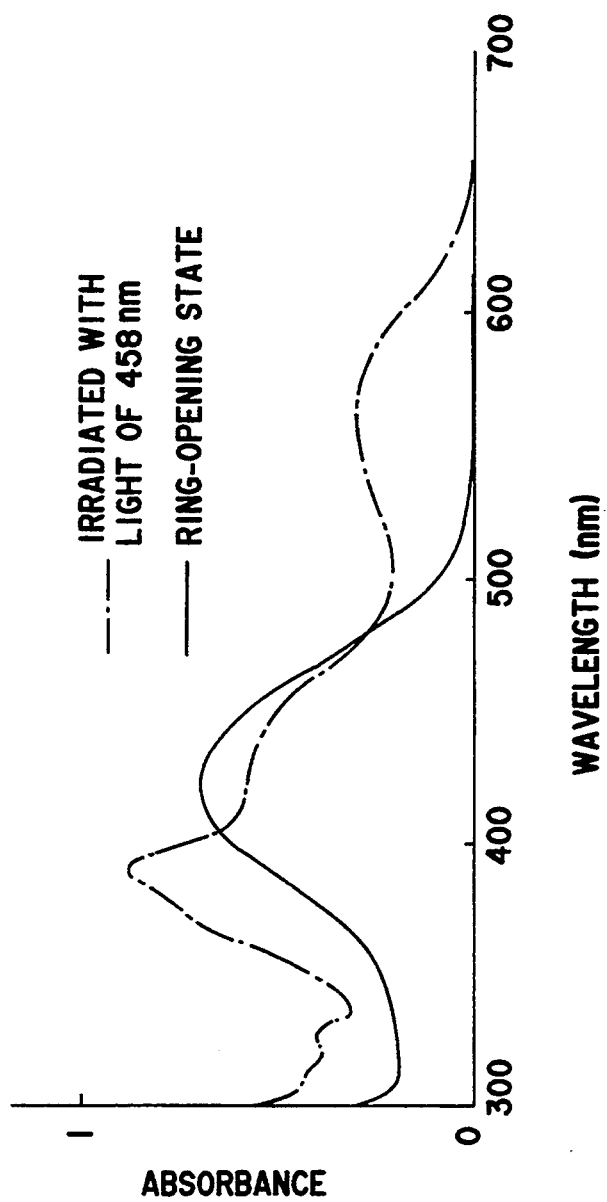
FIG. 4 illustrates absorption spectra of a compound according to Example 1 of the present invention in a benzene solution.
Figure 6:
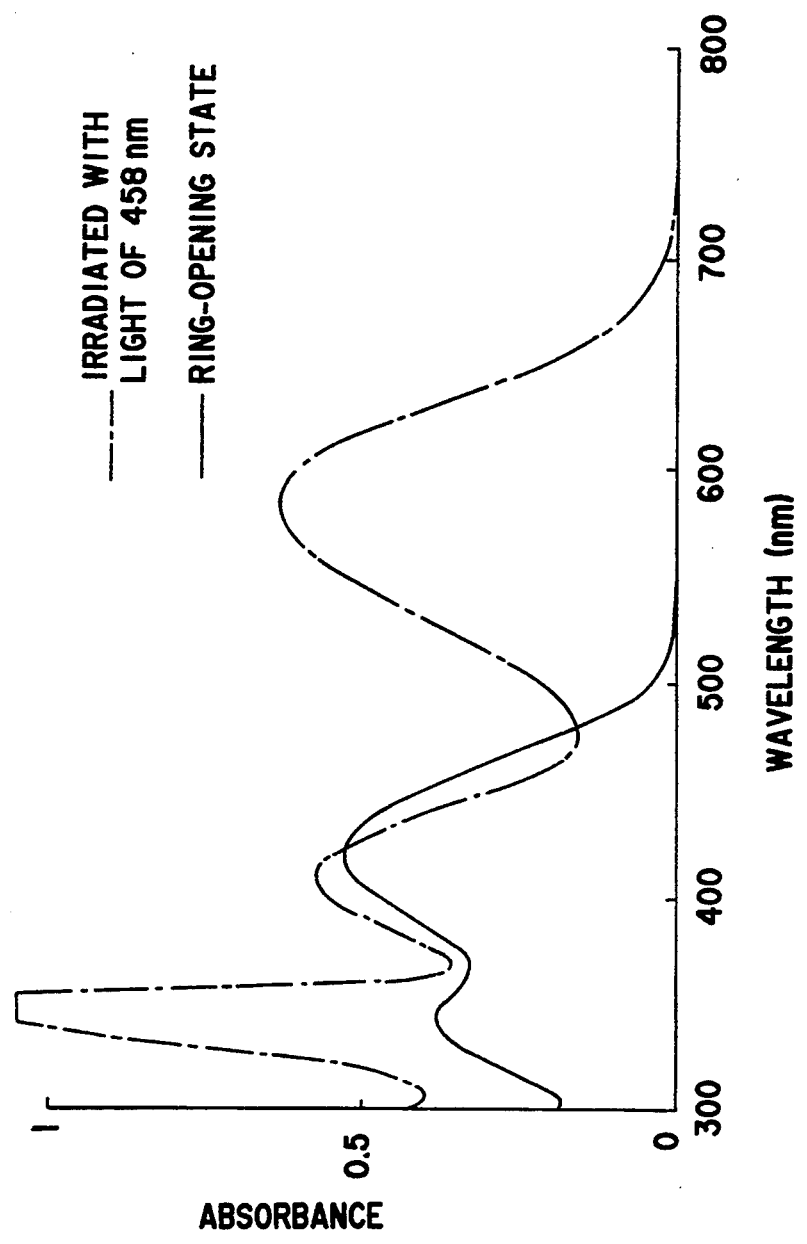
FIG. 6 illustrates absorption spectra of a compound according to Example 2 of the present invention in a benzene solution.

The photochromic compounds according to Examples 1 and 2 obtained in the aforementioned manner were dissolved in benzene to be 10$^{-4}$ mol/l respectively, and the solutions were charged in glass cells. Then, the solutions were irradiated with a beam of 458 nm in wavelength emitted from a xenon lamp through an optical filter, to be colored red. The red solutions were subjected to measurement of absorption spectra. FIGS. 4 and 6 show absorption spectra of the compounds according to Examples 1 and 2 respectively.

Then the colored solutions were irradiated with a beam of at least 546 nm in wavelength, to be changed to the original colors of yellow. FIGS. 4 and 6 also show absorption spectra measured in such states, as those of ring-opening states. Such color changes were reversible.

As understood from FIGS. 4 and 6 (Examples 1 and 2), absorption regions having peaks at 565 nm (Example 1) and 585 nm (Example 2) were caused in the inventive photochromic compounds upon irradiation with the beam of 458 nm in wavelength. Such absorption regions were caused by conversion to closed-ring forms.

Comparative Example 1

Figure 11:
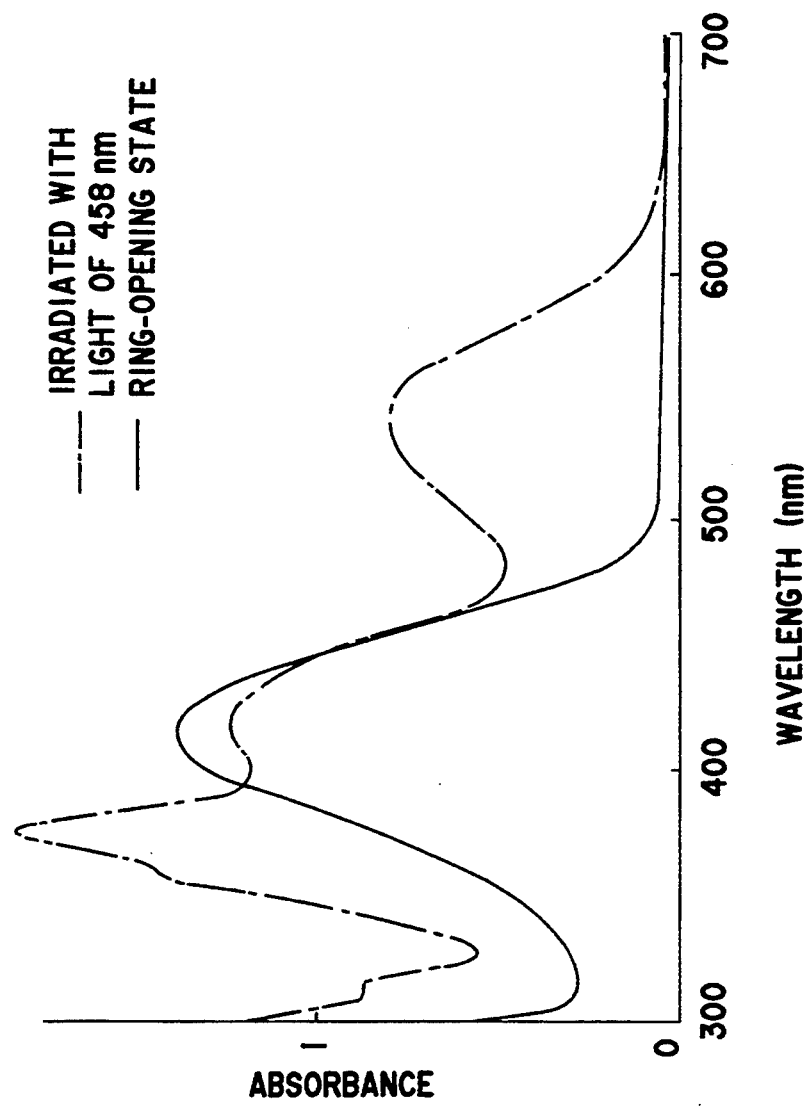
FIG. 11 illustrates absorption spectra of a photochromic compound according to Comparative Example 1 in a benzene solution.

Comparative Example 1 was prepared from a conventional photochromic compound of 2,3-bis-(2-methylbenzo[b]thiophene-3-yl) maleic anhydride, and subjected to measurement of absorption spectra. FIG. 11 shows absorption spectra of this photochromic compound. The conventional photochromic compound has the following structural Formula:

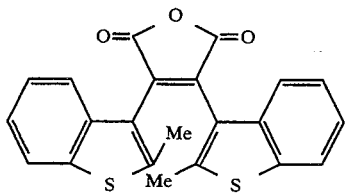

The photochromic compounds according to Examples 1 and 2 and Comparative Example 1 were subjected to measurement of absorption coefficients (1/mol.cm) in solution states. The term "absorption coefficient" refers to a coefficient obtained by quantifying the quantity of light absorbed by 1 mole of molecules. The aforementioned change is increased in proportion to the value of this absorption coefficient.

Each absorption coefficient was calculated on the basis of the following equation:

$$E = \epsilon l c \rightarrow \epsilon = E/lc$$

where E represents absorbance, l represents a measurement length (cm), c represents solution concentration (mol/l), and $\epsilon$ represents the absorption coefficient (1/mol.cm).

Table 1 shows the as-measured absorption coefficients.

TABLE 1

| | Absorptionon Coefficient (1/mol · cm) | |
|---|---|---|
| | Open-Ring Form | Closed-Ring Form |
| Example 1 | 7000 ($\lambda$ = 420 nm) | 12000 ($\lambda$ = 564 nm) |
| Example 2 | 5800 ($\lambda$ = 420 nm) | 8900 ($\lambda$ = 585 nm) |
| Comparative Example 1 | 6800 ($\lambda$ = 417 nm) | 8700 ($\lambda$ = 544 nm) |

As understood from Table 1, the closed-ring form of the compound according to Example 1 exhibits a large absorption coefficient.

Then, the photochromic compounds according to Examples 1 and 2 and Comparative Example 1 were subjected to measurement of changes in transmittance in polystyrene thin films. Each photochromic compound was dissolved in benzene with polystyrene, and the mixture was spin-coated on a glass substrate to form a thin film. The as-obtained thin film was irradiated with a beam of 458 nm in wavelength to enter a photostationary state, and subjected to measurement of a transmission spectrum. Then this thin film was sufficiently irradiated with a beam of at least 546 nm in wavelength, and subjected to measurement of a transmission spectrum.

Figure 5:
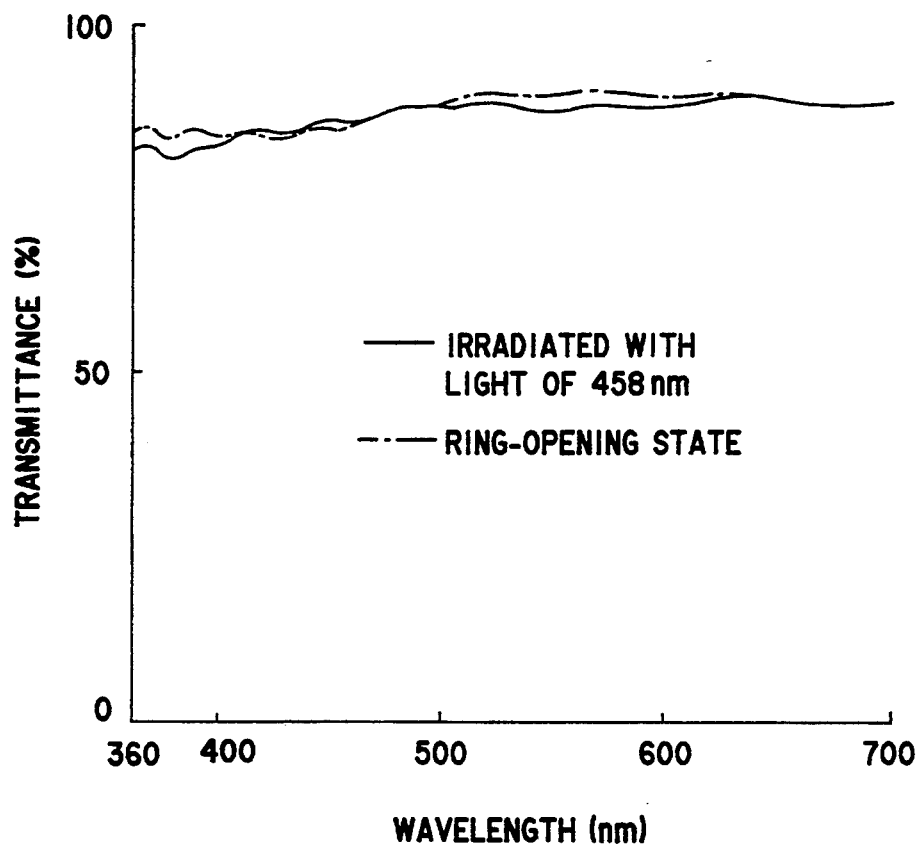
FIG. 5 illustrates transmission spectra of a polystyrene thin film containing 1 percent by weight of the compound according to Example 1 of the present invention.

FIG. 5 shows transmission spectra of a thin film of polystyrene containing 1 percent by weight of the compound according to Example 1, which were measured in a photostationary state upon irradiation with the beam of 458 nm in wavelength and a ring-opening state upon irradiation with the beam of at least 546 nm in wavelength.

Figure 7:
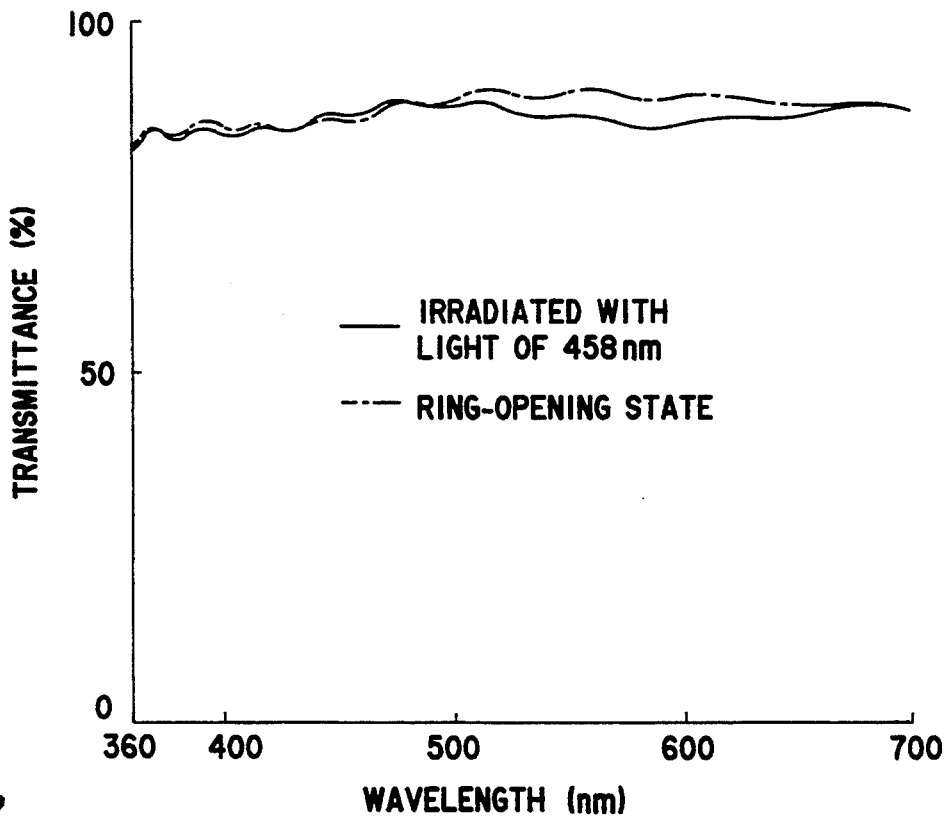
FIG. 7 illustrates transmission spectra of a polystyrene thin film containing 1 percent by weight of the compound according to Example 2 of the present invention.

FIG. 7 shows transmission spectra of a thin film of polystyrene containing 1 percent by weight of the compound according to Example 2, which were measured in a photostationary state upon irradiation with the beam of 458 nm in wavelength and a ring-opening state upon sufficient irradiation with the beam of at least 546 nm in wavelength.

Figure 12:
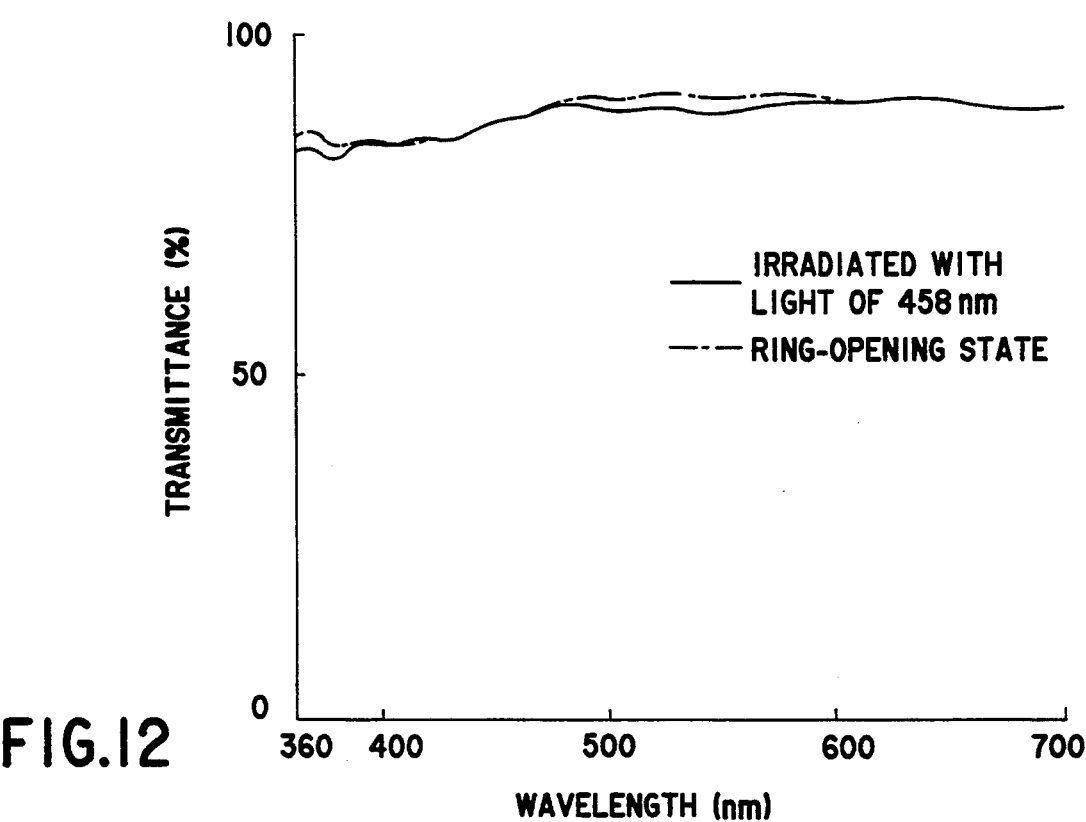
FIG. 12 illustrates transmission spectra of a polystyrene thin film containing 1 percent by weight of the photochromic compound according to Comparative Example 1.

FIG. 12 shows transmission spectra of a thin film of polystyrene containing 1 percent by weight of the compound according to Comparative Example 1, which were measured in a photostationary state upon irradiation with the beam of 458 nm in wavelength and a ring-opening state upon sufficient irradiation with the beam of at least 546 nm in wavelength.

Table 2 transmittance changes at the wavelength of 546 nm.

TABLE 2

| | Transmittance Change |
|---|---|
| Example 1 | about 3% |
| Example 2 | about 4% |
| Comparative Example 1 | about 2% |

As understood from Table 2, the compounds according to Examples 1 and 2 exhibited higher transmittance changes as compared with the compound according to Comparative Example 1 also when the same were contained in polystyrene thin films.

Figure 8:
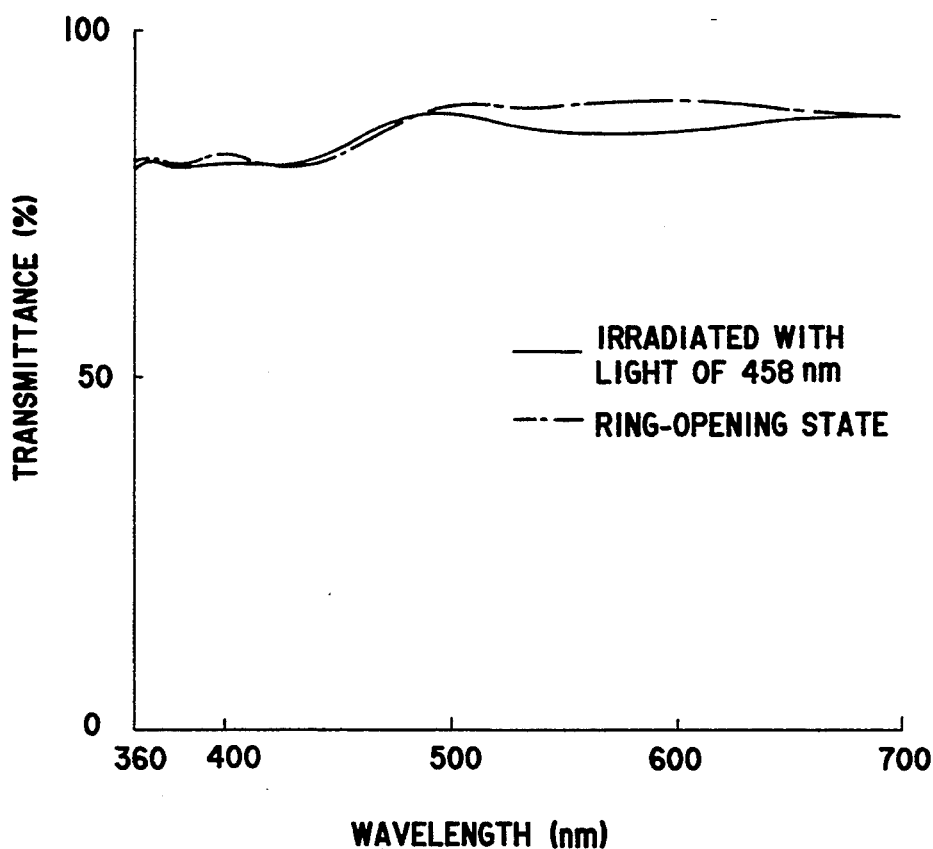
FIG. 8 illustrates transmission spectra of a polystyrene thin film containing 5 percent by weight of the compound according to Example 2 of the present invention.
Figure 9:
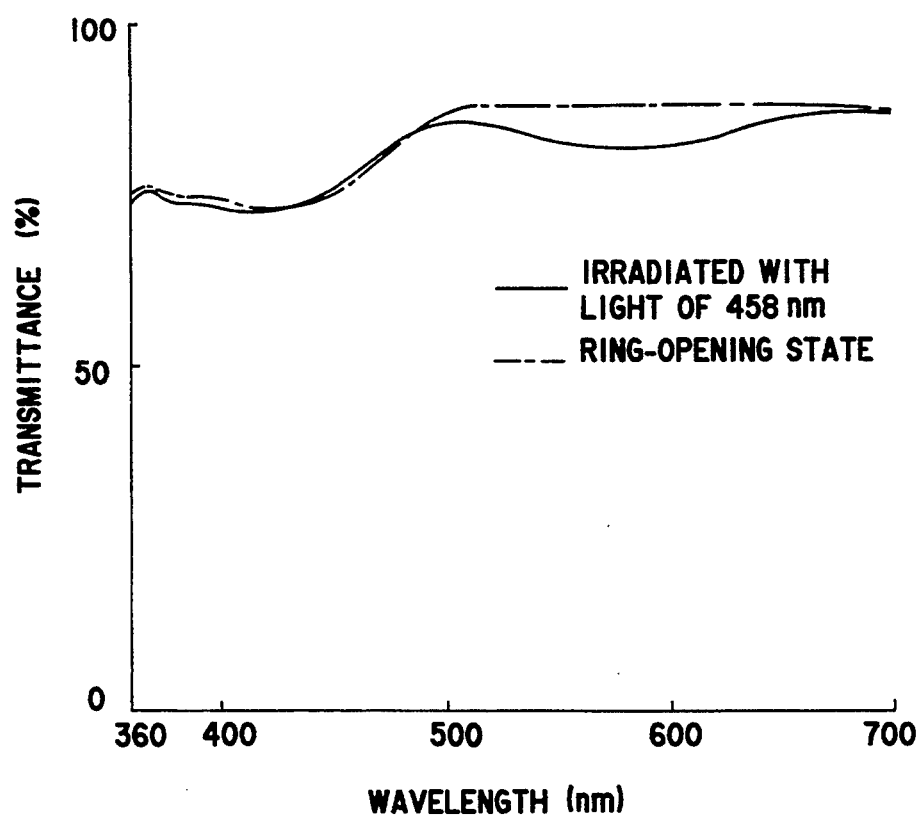
FIG. 9 illustrates transmission spectra of a polystyrene thin Film containing 10 percent by weight of the compound according to Example 2 of the present invention.
Figure 10:
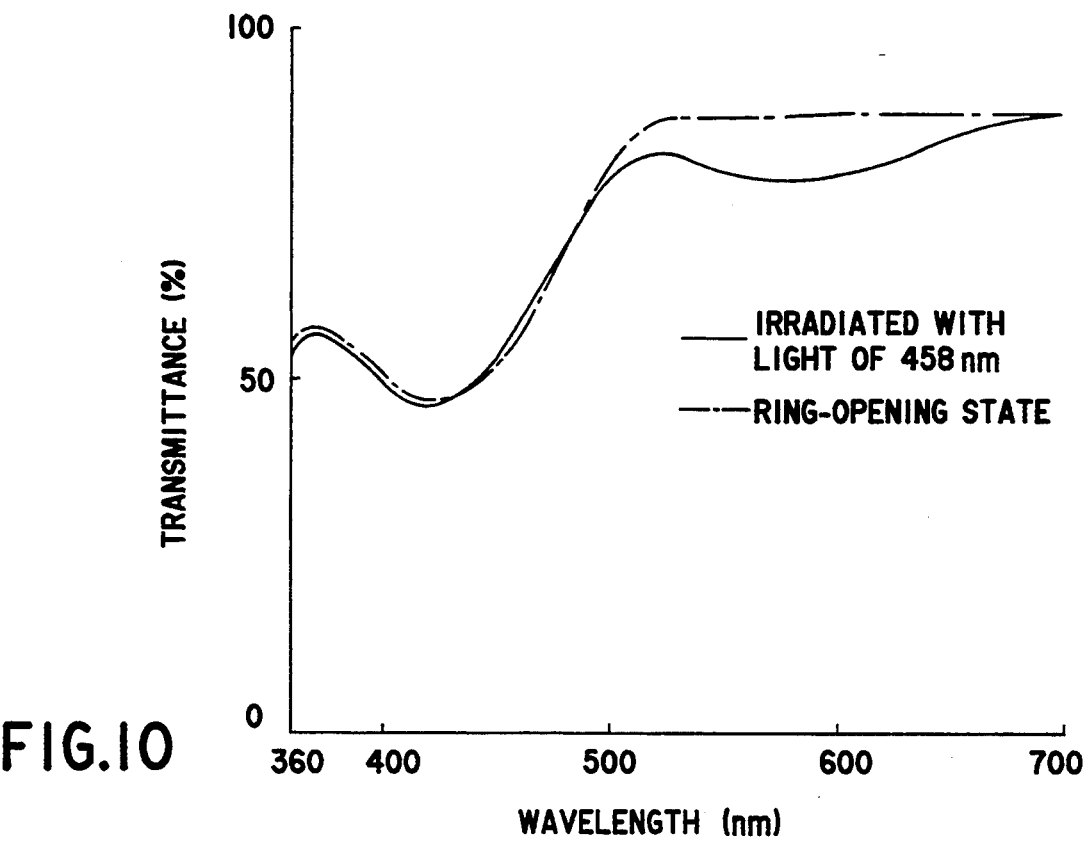
FIG. 10 illustrates transmission spectra of a polystyrene thin film containing 30 percent by weight of the compound according to Example 2 of the present invention.

As to the compound according to Example 2, the content in the polystyrene thin film was further increased for measurement of transmittance changes. FIGS. 8, 9 and 10 show transmission spectra of polystyrene thin films containing 5 percent, 10 percent and 30 percent by weight of the compound according to Example 2 respectively. Table 3 shows transmittance changes caused in the thin films containing this compound in different ratios to resin as shown in FIGS. 7 to 10 upon irradiation with a beam of 546 nm in wavelength. Table 3 also shows such transmittance changes in thin films containing the compound according to Comparative Example 1 in different ratios to resin.

TABLE 3

| | Transmittance Change/ 2 $\mu$m Film Thickness | |
|---|---|---|
| Ratio to Resin | Example 2 | Comparative Example 1 |
| 1 wt. % | 4.0% | 1.6% |
| 5 wt. % | 12.3% | 4.1% |
| 10 wt. % | 15.0% | 6.3% |
| 30 wt. % | 17.2% | 8.3% |

As clearly understood from Table 3, the inventive compound according to Example 2 exhibit transmittance changes which are higher by about three times than those of the compound according to Comparative Example 1.

The compound according to Example 2 exhibits large transmittance changes although its absorption coefficient is not very high in the closed-ring form. This is conceivably because the compound according to Example 2 has a high conversion yield to closed-ring form.

Figure 13:
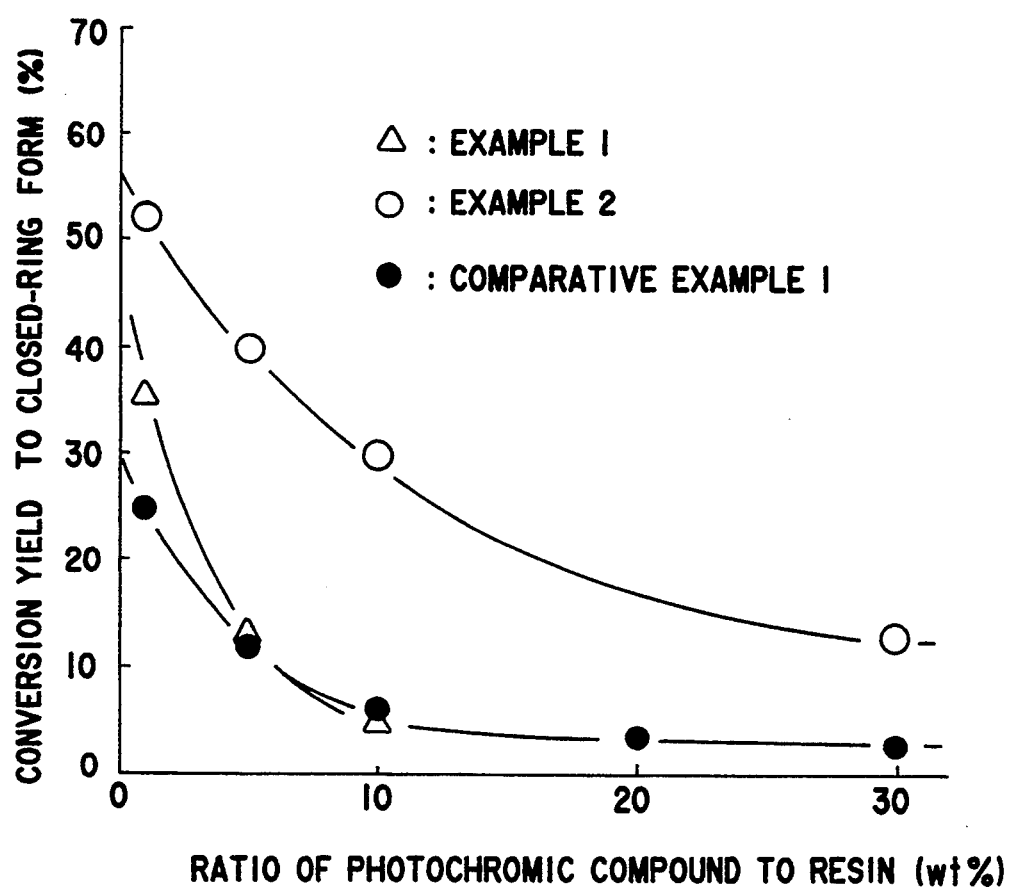
FIG. 13 illustrates conversion yields to closed-ring Form of the compounds according to Examples 1 and 2 of the present invention and Comparative Example 1.

FIG. 13 shows conversion yields to closed-ring form in the compounds according to Examples 1 and 2 and Comparative Example 1 upon irradiation with light. As clearly understood from FIG. 13, the compound according to Example 2 exhibits an extremely high conversion yield to closed-ring form as compared with those of the compounds according to Example 1 and Comparative Example 1. Thus, it seems that the compound according to Example 2 exhibits high transmittance changes due to the high conversion yield to closed-ring form, although the absorption coefficient is not very high in the closed-ring form.

Figure 14:
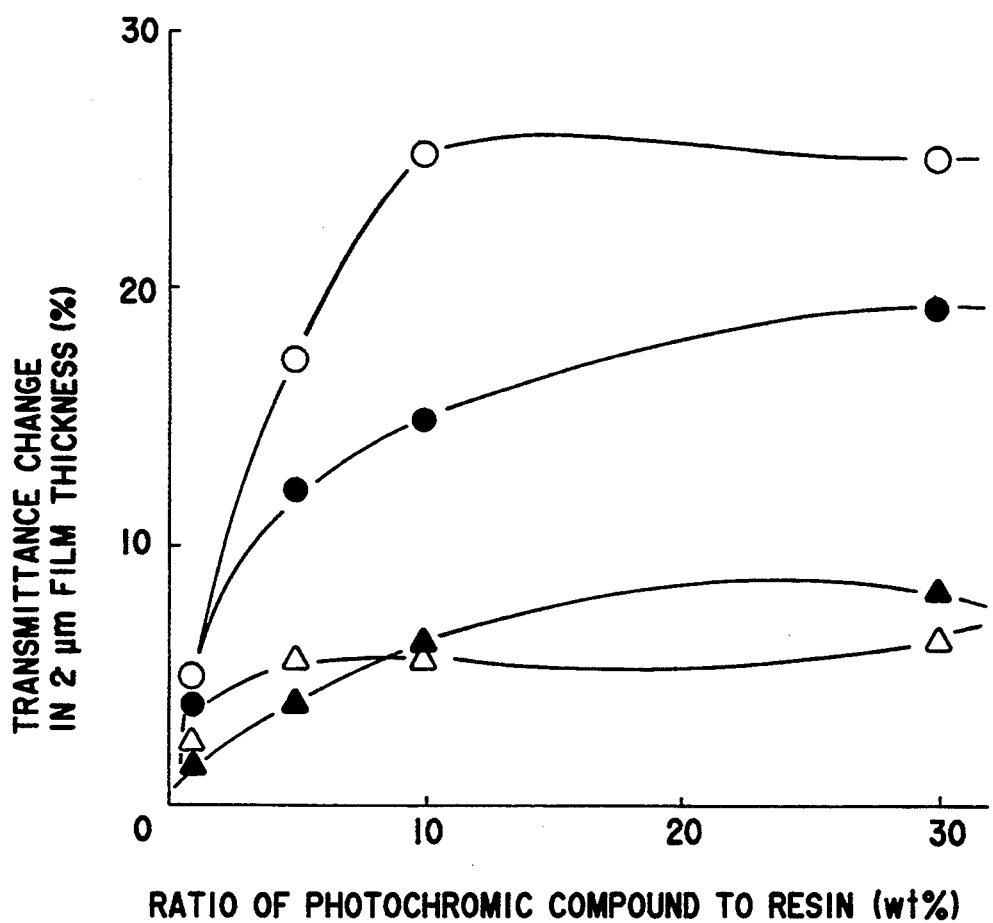
FIG. 14 illustrates transmission spectra of polystyrene thin films containing the compounds according to Example 2 of the present invention and Comparative Example 1.

FIG. 14 shows experimental values of transmittance changes in thin films containing the compounds according to Example 2 and Comparative Example 1, with theoretical values calculated from the absorption coefficients and the conversion yields to closed-ring form of the respective compounds. As clearly understood from FIG. 14, the polystyrene thin film containing the compound according to Example 2 exhibited extremely higher transmittance changes as compared with that containing the compound according to Comparative Example 1. Also when the recording layer is reduced in thickness, therefore, it is possible to obtain changes of optical properties in sufficiently high absolute values, thereby obtaining an excellent signal for recording/reproducing information.

EXAMPLE 3

An exemplary photochromic material according to the second aspect of the present invention, which is expressed in the above general formula (III), where A represents an oxygen atom, $R_1$ represents a $-OCH_3$ group, $R_{10}$ and $R_{11}$ represent $-CH_3$ groups, and $R_2$ to $R_9$ represent hydrogen atoms, is 2-(2-methoxybenzo[b]-thiophene-3-yl)-3-(1,2-dimethyl-3-indolyl) maleic anhydride expressed in the following formula:

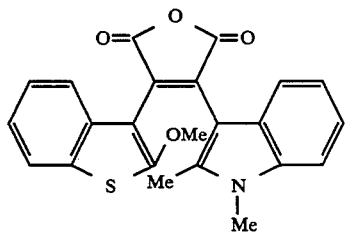

This photochromic compound is hereinafter referred to as a compound (A).

Figure 15:
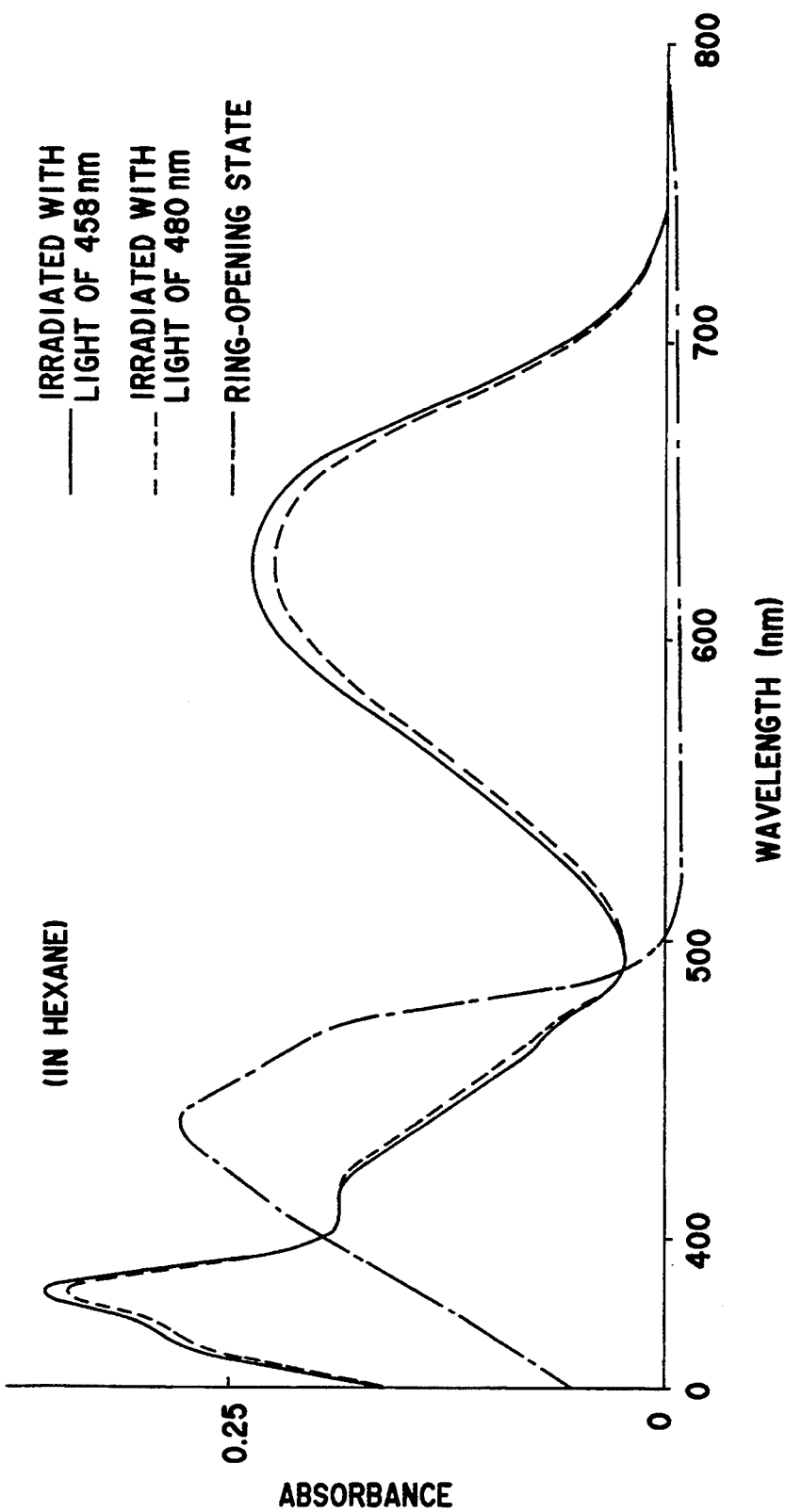
FIG. 15 illustrates absorption spectra of 2-(2-methoxybenzo[b]thiophene-3-yl)-3-(1,2-dimethyl-3-indolyl) maleic anhydride, being a photochromic compound according to Example 3 of the present invention, in hexane.

The aforementioned compound (A) was dissolved in hexane, and this solution was charged in an optical cell, to be subjected to measurement of absorption spectra. FIG. 15 shows the as-obtained absorption spectra.

As clearly understood from FIG. 15, the inventive compound (A) had high sensitivity in the vicinity of a wavelength of 625 nm.

Samples A-1 to A-3 of optical recording mediums were prepared with recording layers containing the compound (A) and polystyrene (hereinafter referred to as PS) having average molecular weight of about 20,000. In order to prepare such recording layers of the optical recording mediums, the aforementioned compound (A) and polystyrene were added to solvents of 100 g of dichloromethane in proportions shown in Table 4, and the as-obtained solutions were applied onto glass substrates by solution casting, and thereafter the solvents were evaporated.

TABLE 4

| Sample No. | Photochromic Compound | PS (g) | Mixing Ratio of Photochromic Compound (A) to PS (wt %) |
|---|---|---|---|
| A-1 | 0.1 | 10 | 1 |
| A-2 | 0.5 | 10 | 5 |
| A-3 | 1.0 | 10 | 10 |

The recording layer of each sample was irradiated with a beam of at least 546 nm in wavelength so that the photochromic compound contained therein was brought into a complete ring-opening state, for measurement of absorbance. It was possible to easily bring the photochromic compound into such a ring-opening state by the irradiation with the beam of at least 546 nm in wavelength. Then, the irradiated portion of the recording layer was irradiated with a beam of 458 nm in wavelength to be brought into a photostationary state, and subjected to measurement of absorbance.

Figure 16:
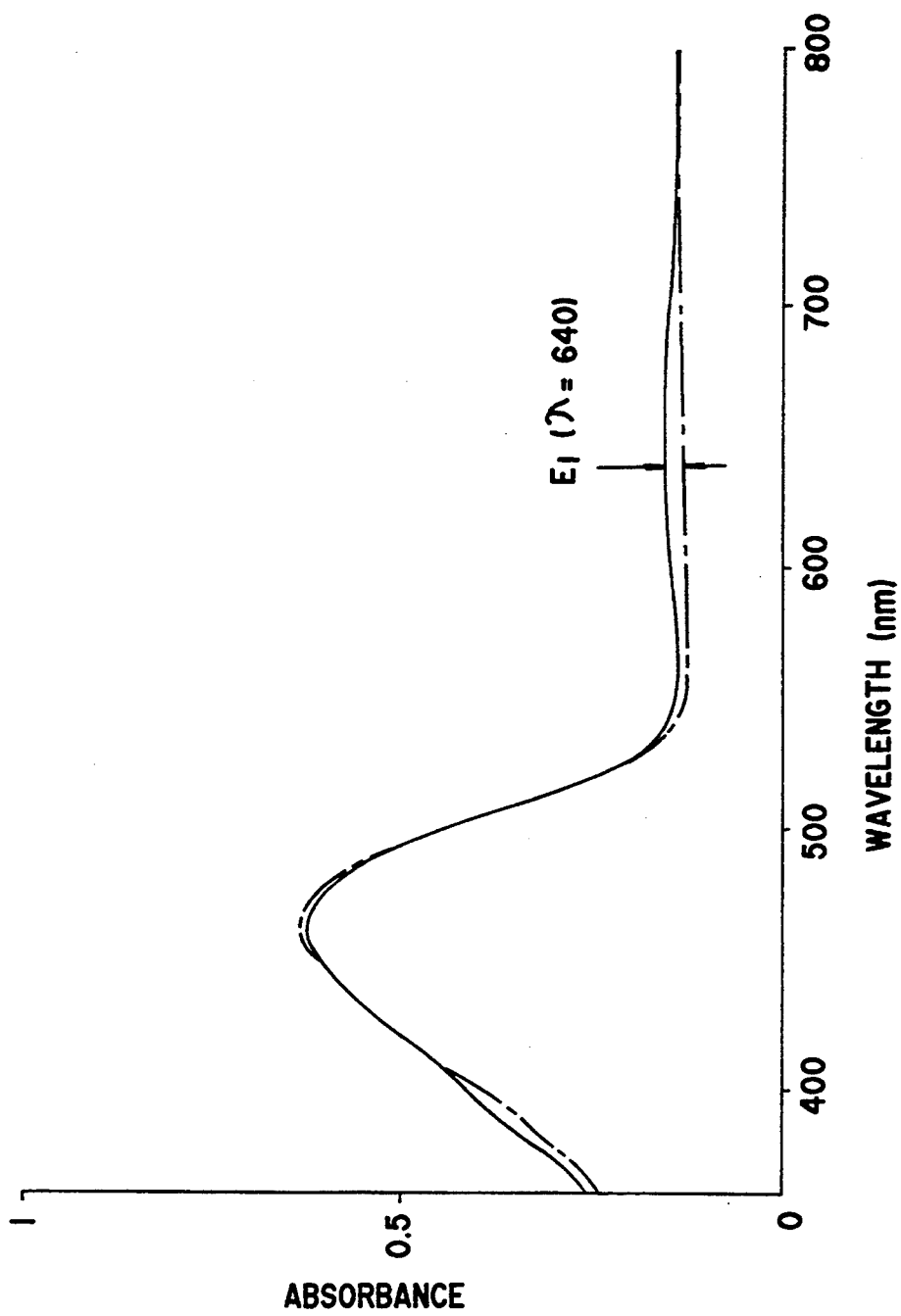
FIG. 16 illustrates absorption spectra of the photochromic compound according to Example 3 of the present invention.

FIG. 16 shows absorption spectra of the compound thus measured in the ring-opening and ring-closure states. Referring to FIG. 16, the one-dot chain line shows the absorption spectrum in the ring-opening state, while the solid line shows that in the photostationary state attained upon irradiation with the beam of 458 nm in wavelength.

In this case, the conversion yield to closed-ring form can be obtained as follows:

First, the absorption coefficient of the compound (A) contained in polystyrene is measured in advance. The absorption coefficient of the open-ring form is measured as follows:

A thin film of constant concentration is prepared and subjected to measurement of the thickness. Thereafter this film is irradiated with a beam of at least 546 nm in wavelength, to be brought into a 100% ring-opening state. Absorbance is measured at the current maximal absorption wavelength of 460 nm, to calculate the absorption coefficient of the open-ring form from the following equations:

$$E = \epsilon l c, \quad \epsilon = E/l \cdot c$$

where E represents the absorbance, $\epsilon$ represents the absorption coefficient (l/mol.cm), l represents the film thickness (cm) and c represents the concentration (mol/l).

As the result of experimental calculation, the absorption coefficient $\epsilon_{460}$ was 9700.

On the other hand, the absorption coefficient of the closed-ring form is obtained as follows:

First, the compound (A) is dissolved in a hexane solution, and this solution is irradiated with a beam of 458 nm in wavelength until the same enters a photostationary state. A closed-ring form contained in this solution is separated by column chromatography, and then condensed. In this process, external light is absolutely intercepted. As to such a 100% closed-ring form, a thin film is formed similarly to the aforementioned process for the open-ring form, to be subjected to measurement of film thickness. The absorption spectrum of the polystyrene thin film containing the 100% closed-ring form is measured to calculate the absorption coefficient of the closed-ring form contained in polystyrene along the aforementioned equations. As the result of experimental calculation, the absorption coefficient $\epsilon_{640}$ was 8900.

It is possible to calculate the conversion yield to closed-ring form in a photostationary state from the absorption coefficient of the closed-ring form obtained in the aforementioned manner.

Absorbance $E_1$ (difference between the solid line and the one-dot chain line) at the maximal absorption wavelength of 640 nm in the absorption spectrum of the photostationary state shown in FIG. 16 is substituted in the following equations to obtain concentration $c_1$ of the closed-ring form:

$$E_1 = \epsilon_1 l c_1, \quad c_1 = E_1/\epsilon_1 l$$

It is possible to calculate the conversion yield to closed-ring form from the ratio ($c_1/c_0$) of the as-obtained closed ring concentration $c_1$ to initial concentration $c_0$.

Figure 17:
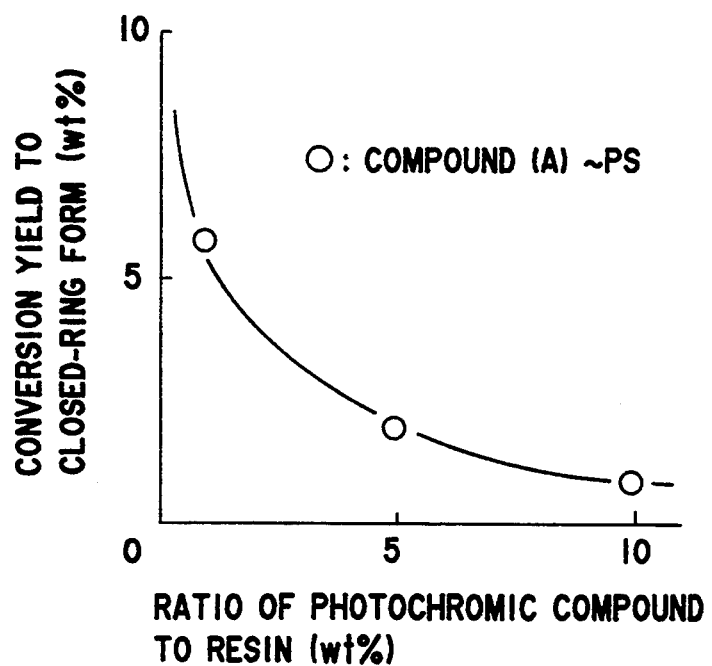
FIG. 17 illustrates concentration dependence of a conversion yield to closed-ring form in an optical recording material according to Example 3 of the present invention.

FIG. 17 shows the conversion yield to closed-ring form in each of the samples A-1 to A-3, which was obtained upon irradiation with a beam of 458 nm in wavelength. The axis of ordinates shows the conversion yield to closed-ring form of the photochromic compound (A), and the axis of abscissas shows the weight mixing ratio (wt. %) of the compound (A) with respect to polystyrene as a ratio to resin.

Figure 18:
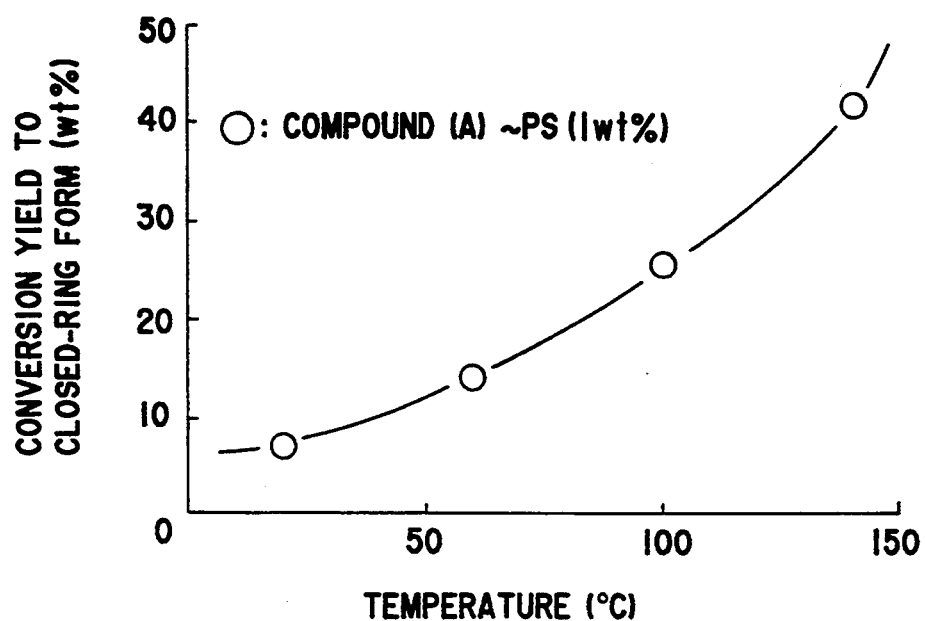
FIG. 18 illustrates temperature dependence of a conversion yield to closed-ring form in the photochromic compound according to Example 3 of the present invention in polystyrene.

The sample A-1 was then set on a heater of a prescribed temperature, irradiated with a beam of 458 nm in wavelength to be brought into a photostationary state, and thereafter cooled to the room temperature, to be subjected to measurement of absorbance. Temperature dependence of the current conversion yield to closed-ring form was obtained. FIG. 18 shows the as-obtained temperature dependence of the conversion yield to closed-ring form. The axis of ordinates shows the conversion yield to closed-ring form in the photochromic compound, and the axis of abscissas shows the temperature. As clearly understood from FIG. 18, the photochromic material which was prepared by dispersing the compound (A) in polystyrene and forming a thin film was substantially unchanged at ordinary temperatures, while the same was extremely changed at the temperature of 140° C. Due to such high temperature dependence, it is possible to easily perform nondestructive reading by simultaneous irradiation with two beams of different wavelengths.

Figure 19:
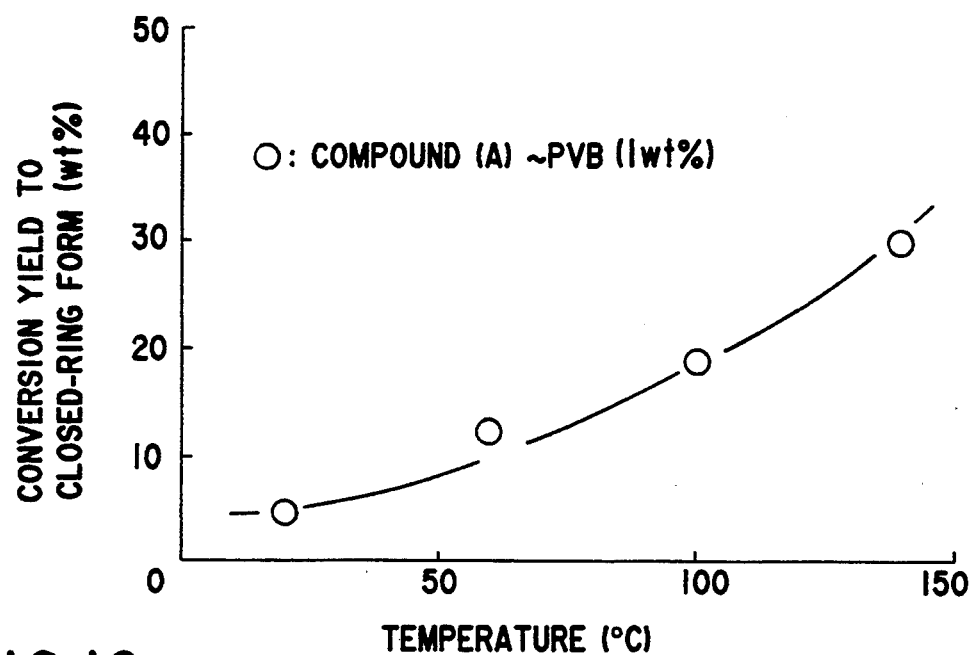
FIG. 19 illustrates temperature dependence of a conversion yield to closed-ring form in the photochromic compound according to Example 3 of the present invention in polyvinyl butyral.

A sample similar to the above was prepared with PVB (polyvinyl butyral) in place of polystyrene, and subjected to measurement of the conversion yield to closed-ring form. FIG. 19 shows the result.

Figure 20:
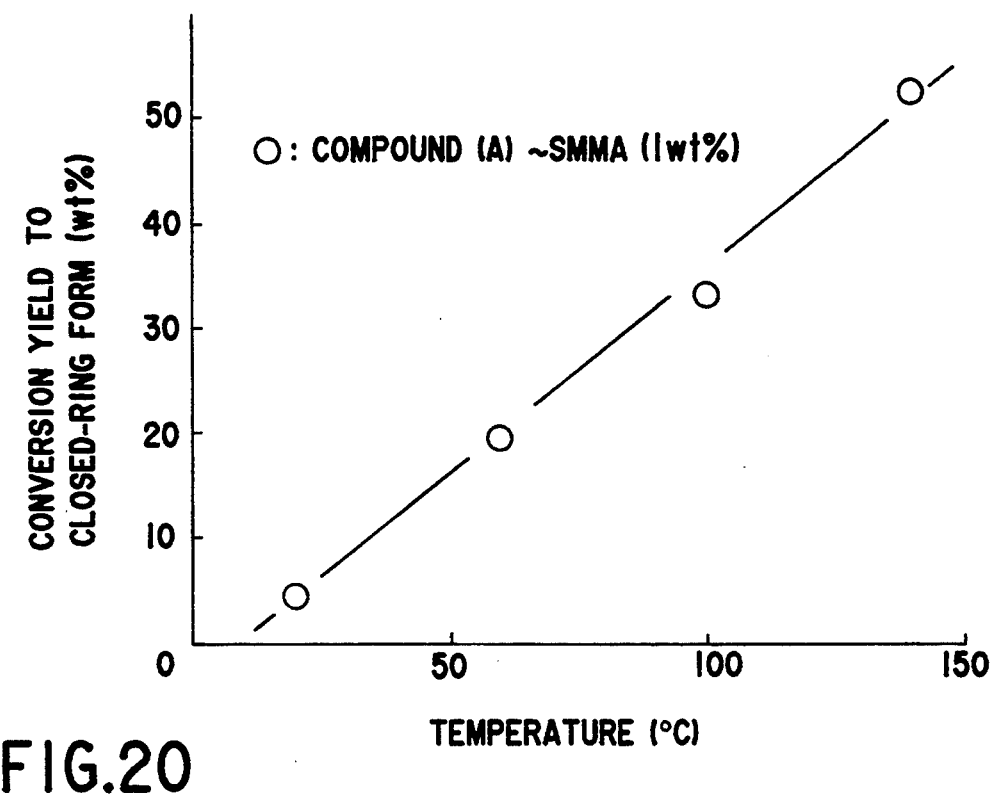
FIG. 20 illustrates temperature dependence of a conversion yield to closed-ring form in the photochromic compound according to Example 3 of the present invention in a styrene-methyl methacrylate copolymer.

A sample similar to the above was prepared with SMMA (styrene-methyl methacrylate copolymer) in place of polystyrene, and subjected to measurement of the conversion yield to closed-ring form. FIG. 20 shows the result.

Figure 21:
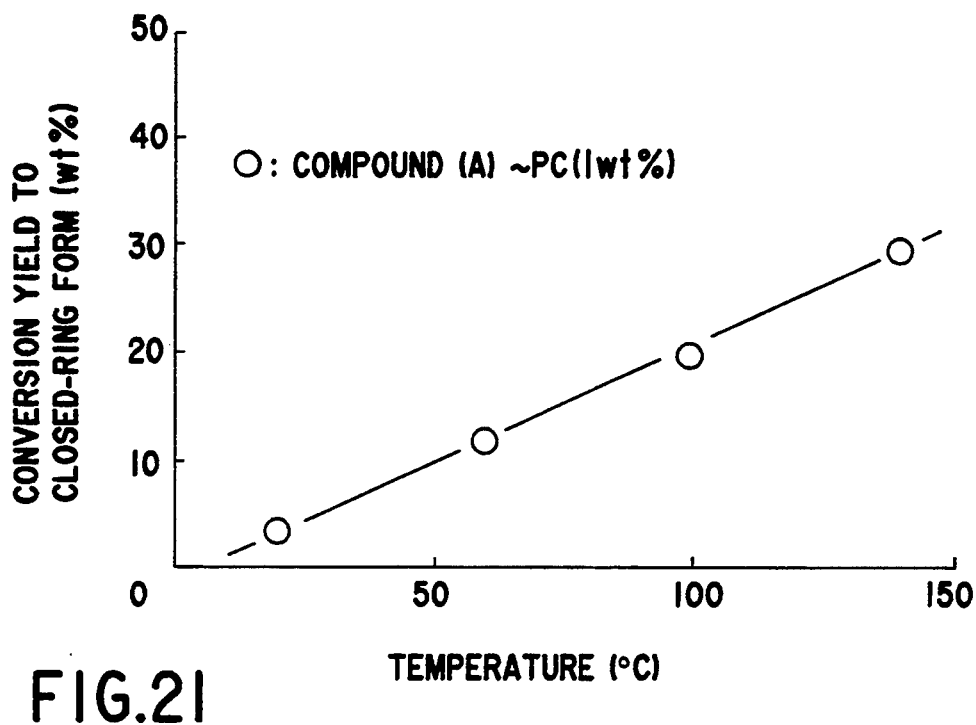
FIG. 21 illustrates temperature dependence of a conversion yield to closed-ring form in the photochromic compound according to Example 3 of the present invention in polycarbonate.

A sample similar to the above was prepared with PC (polycarbonate) in place of polystyrene, and subjected to measurement of the conversion yield to closed-ring form. FIG. 21 shows the result.

Figure 22:
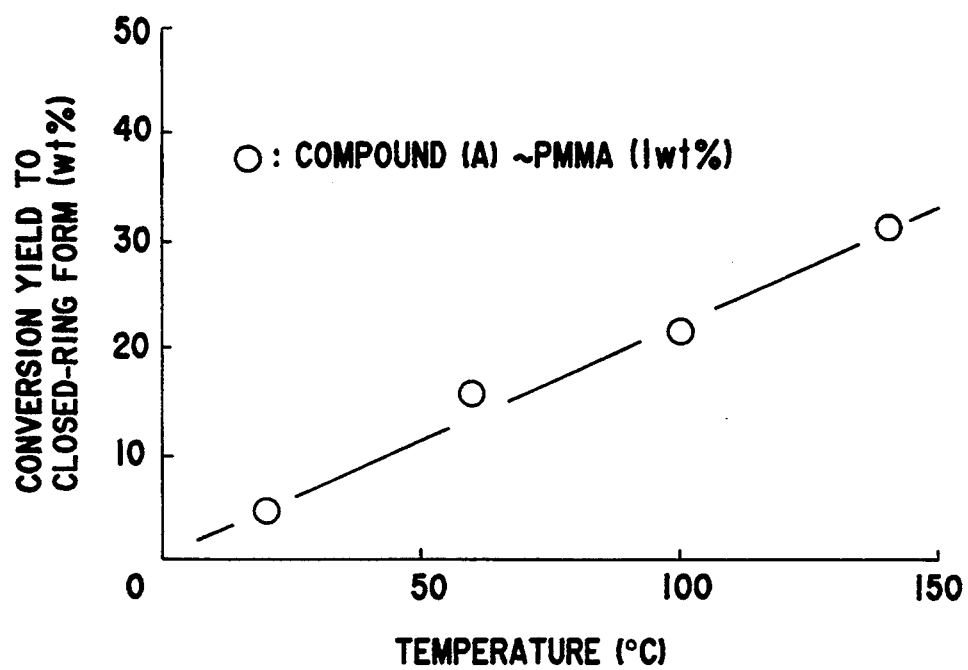
FIG. 22 illustrates temperature dependence of a conversion yield to closed-ring form in the photochromic compound according to Example 3 of the present invention in polymethyl methacrylate.

A sample similar to the above was prepared with PMMA (polymethyl methacrylate) in place of polystyrene, and subjected to measurement of the conversion yield to closed-ring form. FIG. 22 shows the result.

As clearly understood from the results shown in FIGS. 18 to 22, the photochromic compound according to Example 3 exhibit high temperature dependence in various polymers. Thus, it is understood that the optical recording material according to the present invention is favorable for a reproducing method of irradiating a recording layer with a beam of a wavelength which is absorbed by the recording layer being in a colored state for heating the same and reproducing information by irradiating the recording layer with a beam of a specific wavelength in this state while maintaining the colored state of the recording layer.

Figure 23:
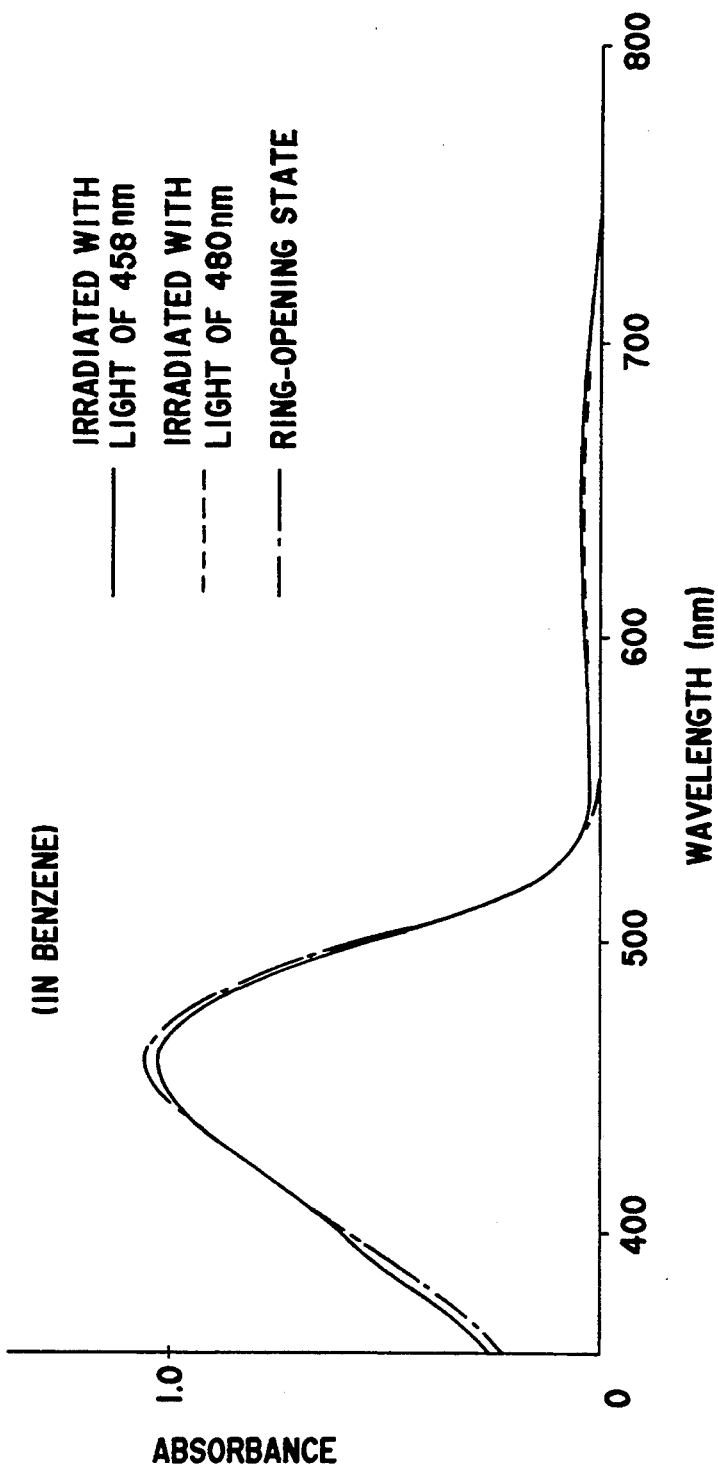
FIG. 23 illustrates absorption spectra of the photochromic compound according to Example 3 of the present invention in benzene.

FIG. 23 shows absorption spectra of the compound (A) in a benzene solution. It is clearly understood from FIG. 23 that the compound (A) is hardly colored when the same is irradiated with beams of 458 nm and 480 nm in wavelength. When contained in a hexane solution, on the other hand, the compound (A) exhibits large changes upon irradiation with beams of 458 nm and 480 nm in wavelength, as shown in FIG. 15. Thus, it is understood that conversion of this compound (A) to a closed-ring form is remarkably influenced by a small change in polarity of the solvent.

Figure 38:
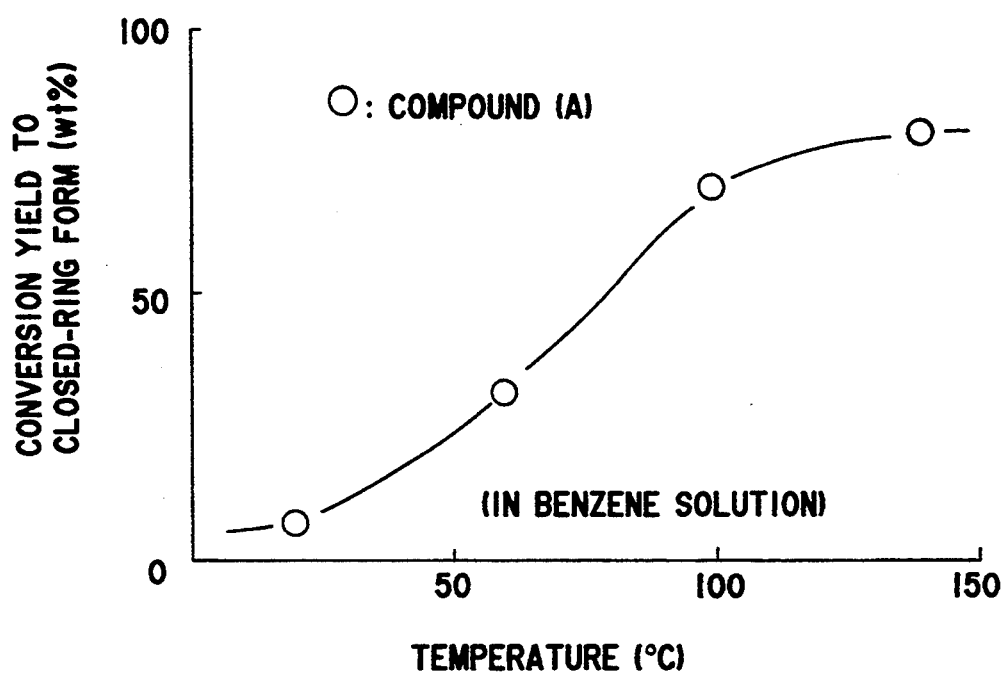
FIG. 38 illustrates temperature dependence of a conversion yield to closed-ring form in the photochromic compound according to Example 3 of the present invention in benzene.

As described above, the compound (A) exhibits no extreme change in a benzene solution. However, it has been found that this compound (A) is changeable in a benzene solution when the same is heated. FIG. 38 shows temperature dependence of a conversion yield to closed-ring form of the compound (A) in a benzene solution. As clearly understood from FIG. 38, the compound (A) exhibits such high temperature dependence in the benzene solution that the conversion yield is close to that (92 %) in a hexane solution at a temperature of 140° C. Thus, it is conceivable that the dielectric constant of benzene is reduced with temperature increase to approach that of hexane, thereby facilitating changes of the compound (A).

EXAMPLE 4

An exemplary photochromic material according to the second aspect of the present invention, which is expressed in the above general formula (III), where A represents an oxygen atom, $R_1$ represents a $-OC_2H_5$ group, $R_{10}$ and $R_{11}$ represent $-CH_3$ groups, and $R_2$ to $R_9$ represent hydrogen atoms, is 2-(2-ethoxybenzo[b]thiophene-3-yl)-3-(1,2-dimethyl-3-indolyl) maleic anhydride expressed in the Following formula:

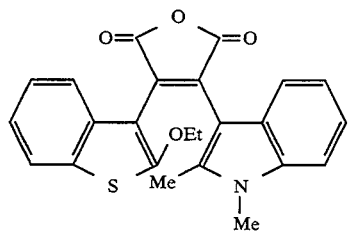

This photochromic compound is hereinafter referred to as a compound (B).

Figure 24:
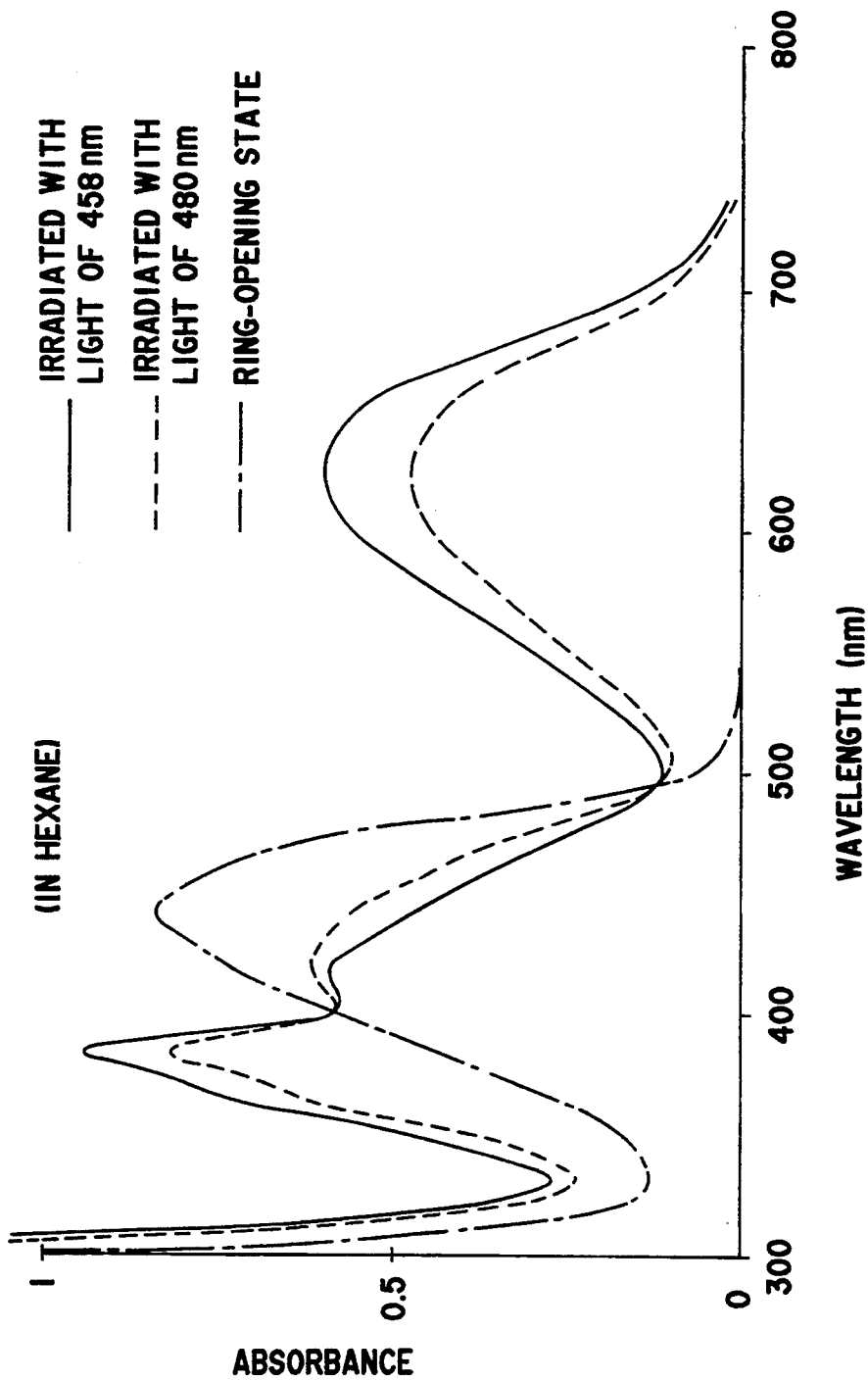
FIG. 24 illustrates absorption spectra of a photochromic compound according to Example 4 of the present invention.

This compound (B) was dissolved in hexane, and the as-obtained solution was charged in an optical cell to be subjected to measurement of absorption spectra. FIG. 24 shows the as-obtained absorption spectra. As clearly understood from FIG. 24, this compound (B) has high sensitivity in the vicinity of a wavelength of 625 nm.

Then, samples B-1 to B-3 of optical recording mediums were prepared with recording layers containing the compound (B) and polystyrene (PS) having average molecular weight of 20,000. In order to prepare the recording layers of the optical recording mediums, the compound (B) and polystyrene were added to solvents of 100 g of dichloromethane in proportions shown in Table 5, and then the solvents were evaporated.

TABLE 5

| Sample No. | Photochromic Compound | PS (g) | Mixing Ratio of Photochromic Compound (B) to PS (wt %) |
|---|---|---|---|
| B-1 | 0.1 | 10 | 1 |
| B-2 | 0.5 | 10 | 5 |
| B-3 | 1.0 | 10 | 10 |

The recording layer of each sample was irradiated with a beam of at least 546 nm in wavelength so that the photochromic compound contained therein was brought into a complete ring-opening state, for measurement of absorbance. It was possible to easily bring the photochromic compound into such a ring-opening state by irradiating the same with the beam of at least 546 nm in wavelength.

Then, the irradiated portion of the recording layer was irradiated with a beam of 458 nm in wavelength to be brought into a photostationary state, for measurement of absorbance. In this case, a conversion yield to closed-ring form was calculated on the basis of the aforementioned method.

Figure 25:
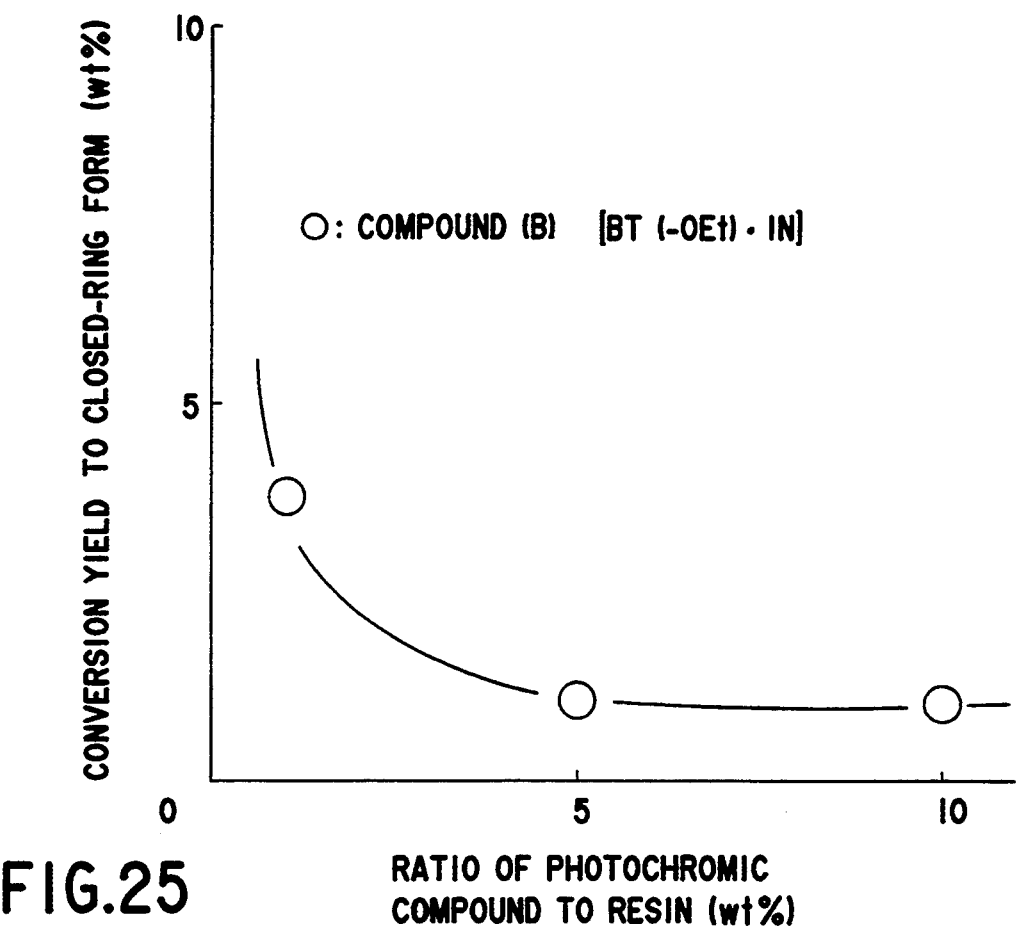
FIG. 25 illustrates concentration dependence of a conversion yield to closed-ring form in an optical recording material according to Example 4 of the present invention.

FIG. 25 shows the conversion yield to closed-ring form in each of the samples B-1 to B-3 which were irradiated with the beam of 458 nm in wavelength. The axis of ordinates shows the conversion yield to closed-ring form of the photochromic compound (B), and the axis of abscissas shows the weight mixing ratio of the photochromic compound with respect to PS as a ratio to resin.

Then the sample B-1 was set on a heater of a prescribed temperature, irradiated with a beam of 458 nm in wavelength to be brought into a photostationary state, and thereafter cooled to the room temperature, to be subjected to measurement of absorbance. Temperature dependence of the current conversion yield to closed-ring form was obtained.

Figure 26:
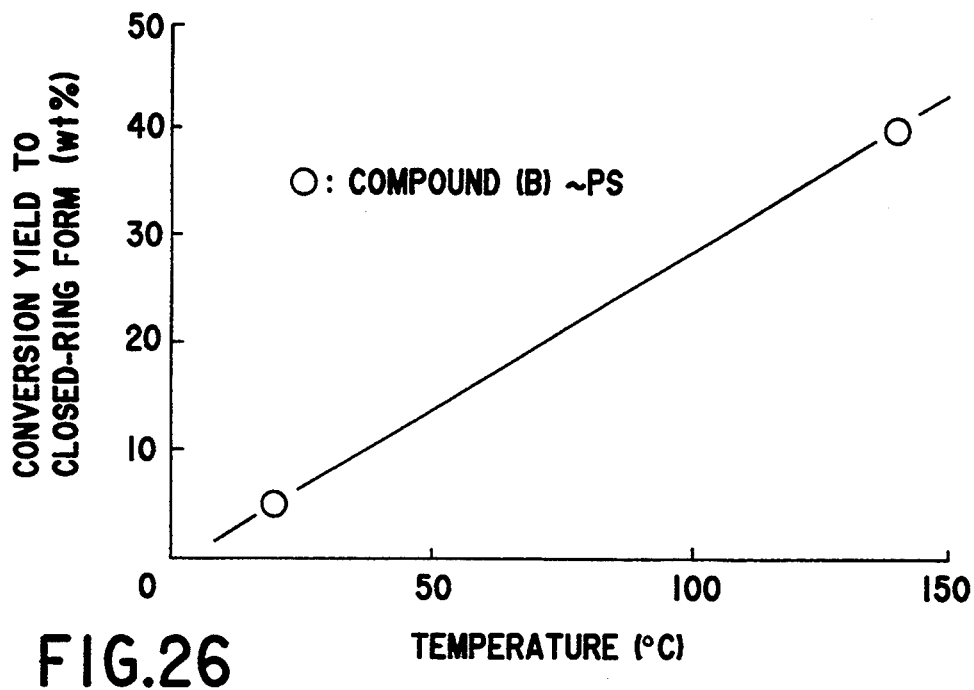
FIG. 26 illustrates temperature dependence of a conversion yield to closed-ring form in the photochromic compound according to Example 4 of the present invention in polystyrene.

FIG. 26 shows the as-obtained temperature dependence of the conversion yield to closed-ring form. The axis of ordinates shows the conversion yield to closed-ring form in the photochromic compound (B), and the axis of abscissas shows the temperature. As clearly understood from FIG. 26, this film was substantially unchanged at ordinary temperatures, while the same was extremely changed at the temperature of 140° C. Due to such high temperature dependence, it is possible to easily perform nondestructive reading by simultaneous irradiation with two beams of different wavelengths.

Figure 27:
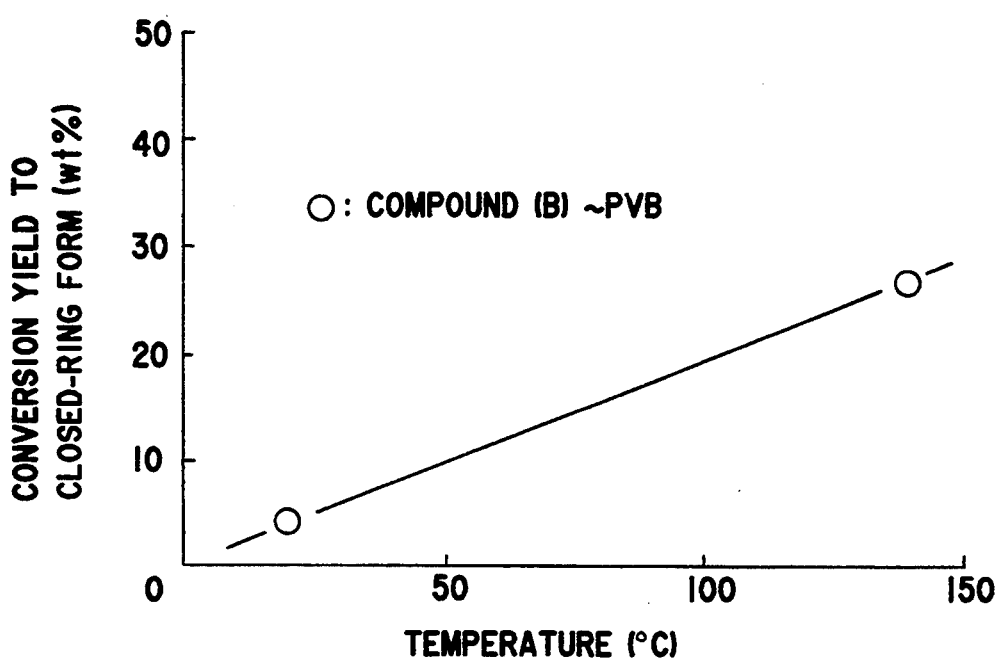
FIG. 27 illustrates temperature dependence of a conversion yield to closed-ring form in the photochromic compound according to Example 4 of the present invention in polyvinyl butyral.

A sample similar to the above was prepared with PVB (polyvinyl butyral) in place of PS, and subjected to measurement of the conversion yield to closed-ring form. FIG. 27 shows the result.

Figure 28:
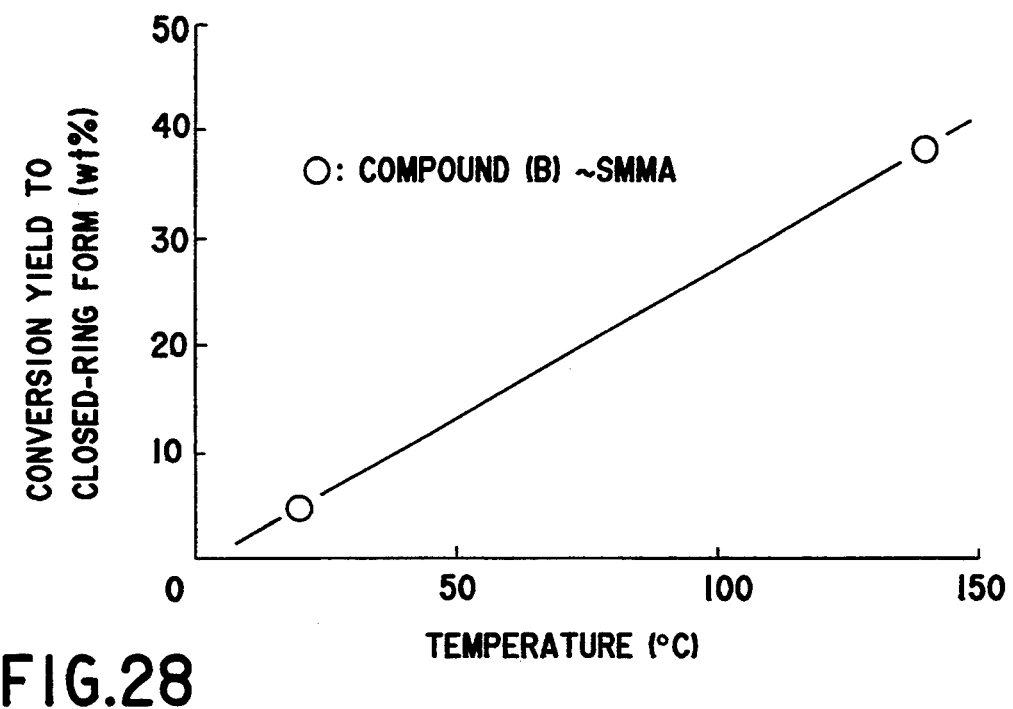
FIG. 28 illustrates temperature dependence of a conversion yield to closed-ring form in the photochromic compound according to Example 4 of the present invention in a styrene-methyl methacrylate copolymer.

A sample similar to the above was prepared with SMMA (styrene-methyl methacrylate copolymer) in place of PS, and subjected to measurement of the conversion yield to closed-ring form. FIG. 28 shows the result.

Figure 29:
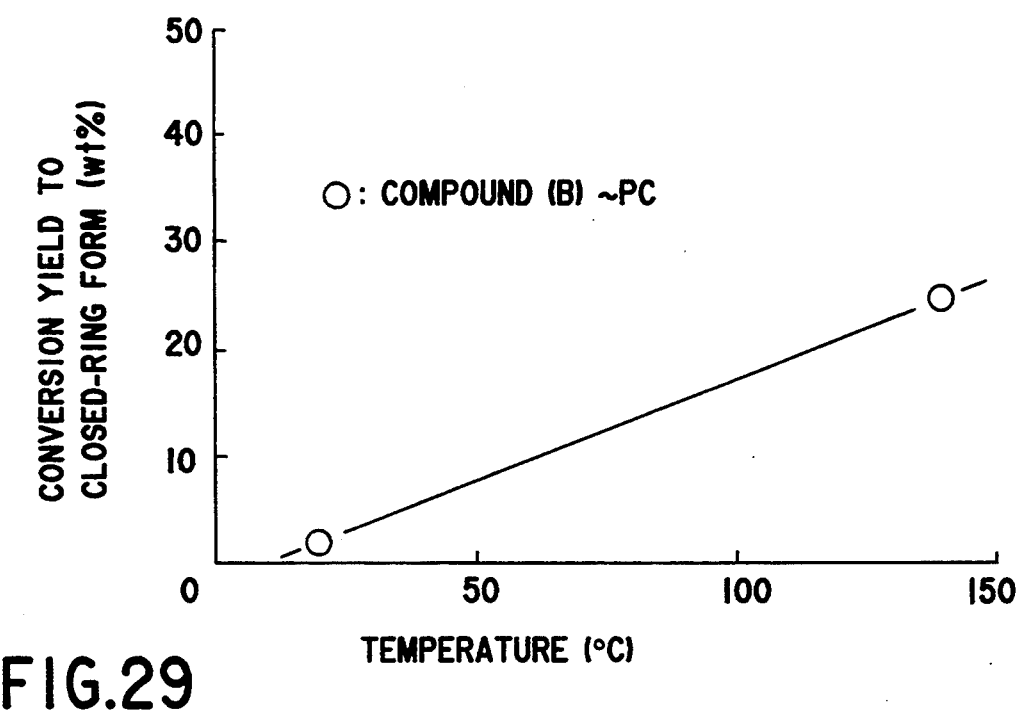
FIG. 29 illustrates temperature dependence of a conversion yield to closed-ring form in the photochromic compound according to Example 4 of the present invention in polycarbonate.

A sample similar to the above was prepared with PC (polycarbonate) in place of PS, and subjected to measurement of the conversion yield to closed-ring form. FIG. 29 shows the result.

Figure 30:
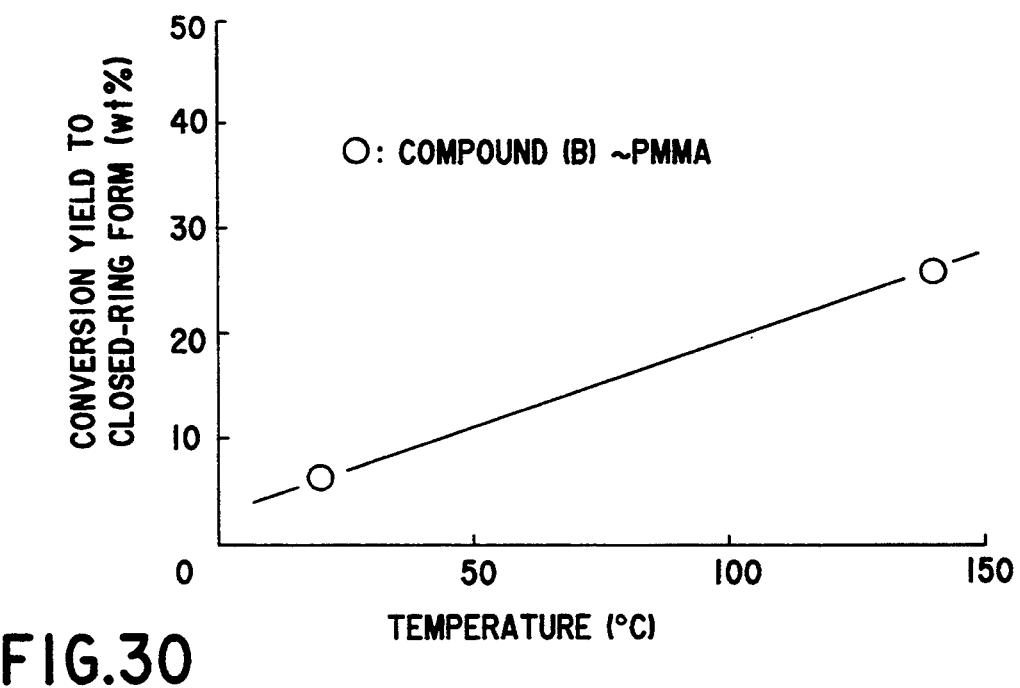
FIG. 30 illustrates temperature dependence of a conversion yield to closed-ring form in the photochromic compound according to Example 4 of the present invention in methyl polymethacrylate.

A sample similar to the above was prepared with PMMA (polymethyl methacrylate) in place of PS, and subjected to measurement of the conversion yield to closed-ring form. FIG. 30 shows the result.

EXAMPLE 5

An exemplary photochromic material according to the second aspect of the present invention, which is expressed in the above general formula (III), where A represents an oxygen atom, $R_1$ and $R_7$ represent —$OCH_3$ groups, $R_2$ to $R_6$ and $R_8$ and $R_9$ represent hydrogen atoms, and $R_{10}$ and $R_{11}$ represent —$CH_3$ groups, is 2-(2-methoxybenzo[b]thiophene-3-yl)-3-(1,2-dimethyl-5-methoxy-3-indolyl) maleic anhydride expressed in the following formula:

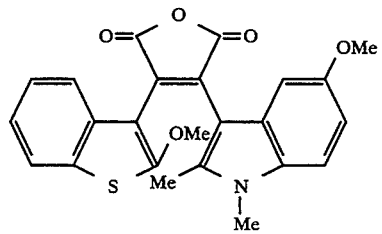

This photochromic compound is hereinafter referred to as a compound (C).

Figure 31:
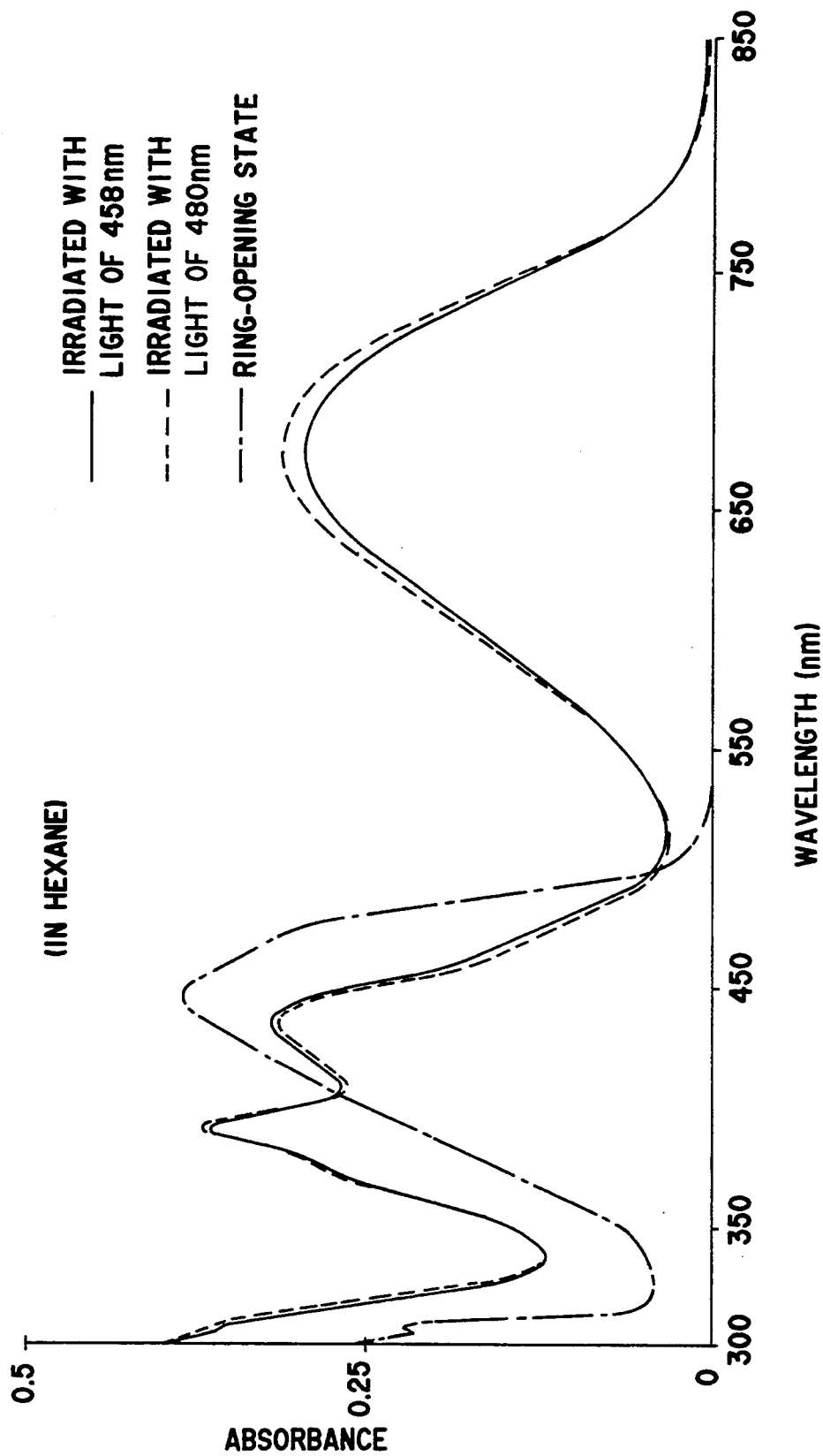
FIG. 31 illustrates absorption spectra of a photochromic compound according to Example 5 of the present invention.

This compound (C) was dissolved in hexane, and the as-obtained solution was charged in an optical cell to be subjected to measurement of absorption spectra. FIG. 31 shows the as-obtained absorption spectra. It is clearly understood from FIG. 31 that this compound (C) has high sensitivity in the vicinity of a wavelength of 680 nm.

Then, samples C-1 to C-3 of optical recording mediums were prepared with recording layers containing the compound (C) and polystyrene (PS) having average molecular weight of 20,000. In order to prepare the recording layers of the optical recording mediums, the compound (C) and polystyrene were added to solvents of 100 g of dichloromethane in proportions shown in Table 6, and thereafter the solvents were evaporated.

TABLE 6

| Sample No. | Photochromic Compound | PS (g) | Mixing Ratio of Photochromic Compound (C) to PS (wt %) |
|---|---|---|---|
| C-1 | 0.1 | 10 | 1 |
| C-2 | 0.5 | 10 | 5 |
| C-3 | 1.0 | 10 | 10 |

The recording layer of each sample was irradiated with a beam of at least 546 nm in wavelength so that the photochromic compound contained therein was brought into a complete ring-opening state, for measurement of absorbance. It was possible to easily bring the photochromic compound into such a ring-opening state by irradiation with the beam of at least 546 nm in wavelength.

Then, the irradiated portion of the recording layer was irradiated with a beam of 458 nm in wavelength to be brought into a photostationary state, for measurement of absorbance. In this case, a conversion yield to closed-ring form was calculated on the basis of the aforementioned method.

Figure 32:
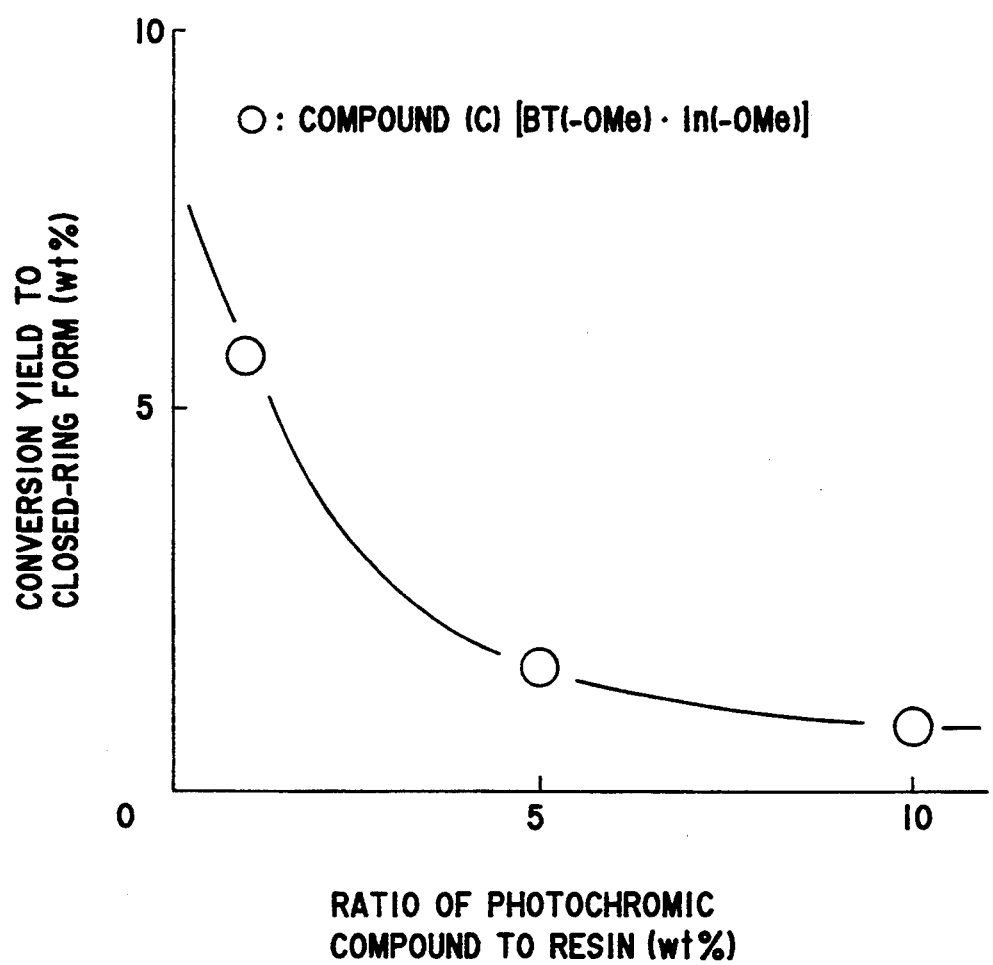
FIG. 32 illustrates concentration dependence of a conversion yield to closed-ring form in an optical recording material according to Example 5 of the present invention.

FIG. 32 shows the conversion yield to closed-ring form in each of the samples C-1 to C-3 which were irradiated with the beam of 458 nm in wavelength. The axis of ordinates shows the conversion yield to closed-ring form of the photochromic compound (B), and the axis of abscissas shows the weight mixing ratio of the photochromic compound with respect to PS as a ratio to resin.

Then the sample C-1 was set on a heater of a prescribed temperature, irradiated with a beam of 458 nm in wavelength to be brought into a photostationary state, and thereafter cooled to the room temperature, to be subjected to measurement of absorbance. Temperature dependence of the current conversion yield to closed-ring form was obtained.

Figure 33:
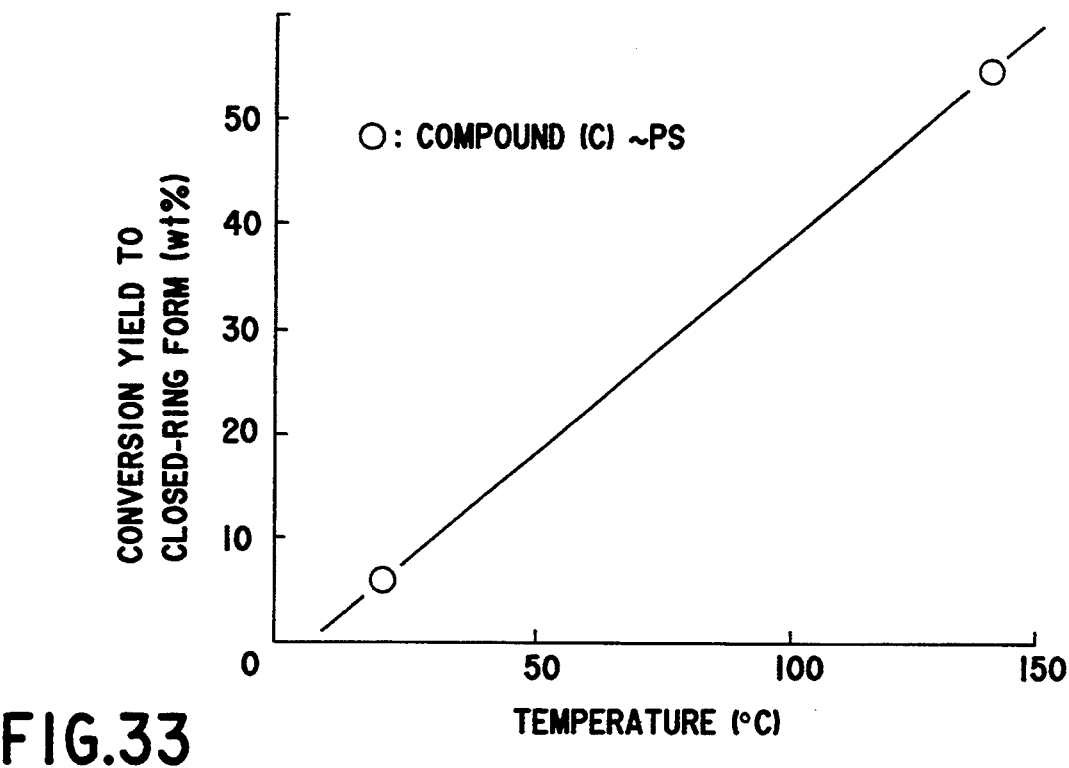
FIG. 33 illustrates temperature dependence of a conversion yield to closed-ring form in the photochromic compound according to Example 5 of the present invention in polystyrene.

FIG. 33 shows the as-obtained temperature dependence of the conversion yield to closed-ring form. The axis of ordinates shows the conversion yield to closed-ring form of the photochromic compound (C), and the axis of abscissas shows the temperature. As clearly understood from FIG. 33, this film was substantially unchanged at ordinary temperatures, while the same was extremely changed at the temperature of 140° C. Due to such high temperature dependence, it is possible to easily perform nondestructive reading by simultaneous irradiation with two beams of different wavelengths.

Figure 34:
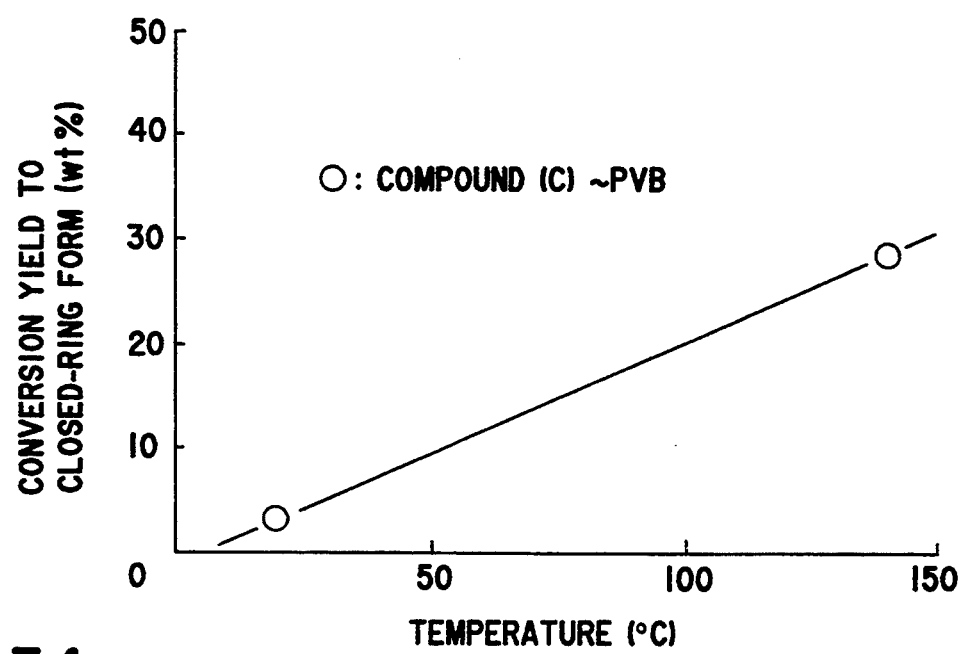
FIG. 34 illustrates temperature dependence of a conversion yield to closed-ring form in the photochromic compound according to Example 5 of the present invention in polyvinyl butyral.

A sample similar to the above was prepared with PVB (polyvinyl butyral) in place of PS, and subjected to measurement of the conversion yield to closed-ring form. FIG. 34 shows the result.

Figure 35:
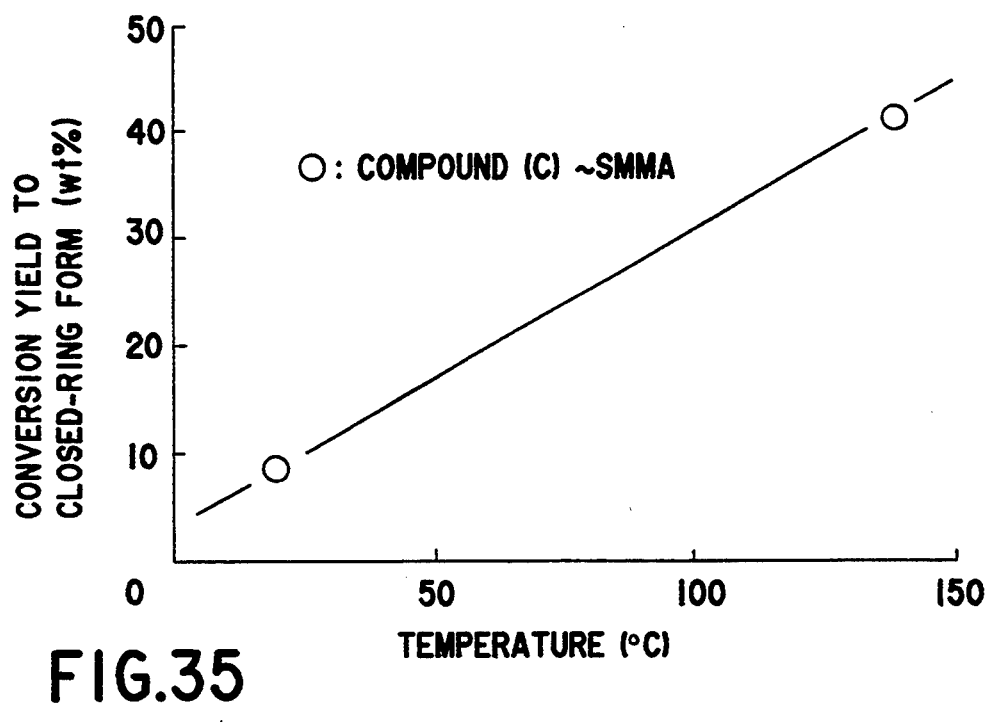
FIG. 35 illustrates temperature dependence of a conversion yield to closed-ring form in the photochromic compound according to Example 5 of the present invention in a styrene-methyl methacrylate copolymer.

A sample similar to the above was prepared with SMMA (styrene-methyl methacrylate copolymer) in place of PS, and subjected to measurement of the conversion yield to closed-ring form. FIG. 35 shows the result.

Figure 36:
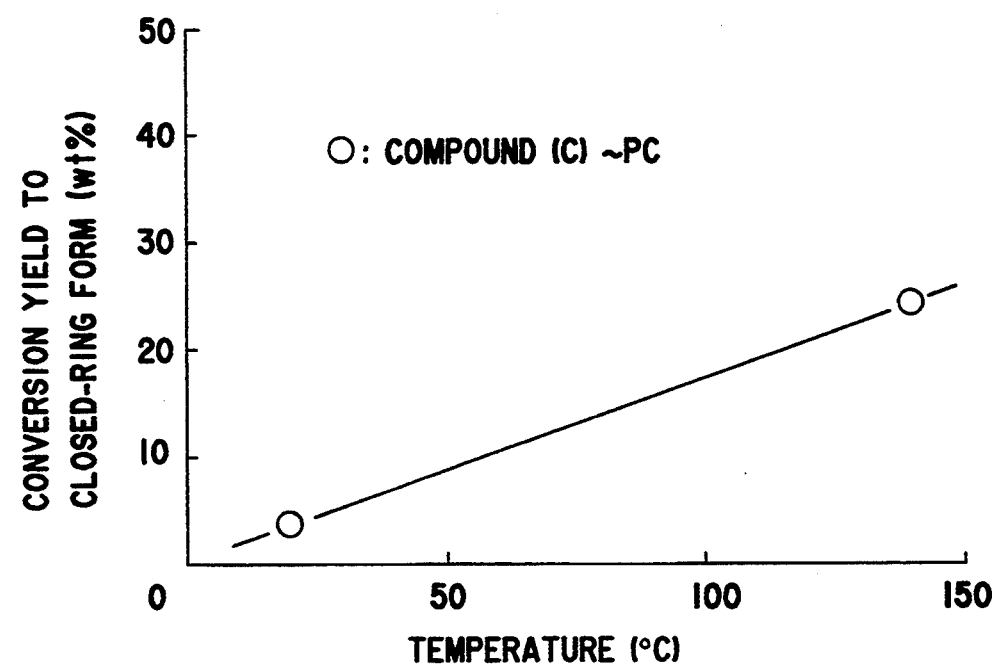
FIG. 36 illustrates temperature dependence of a conversion yield to closed-ring form in the photochromic compound according to Example 5 of the present invention in polycarbonate.

A sample similar to the above was prepared with PC (polycarbonate) in place of PS, and subjected to measurement of the conversion yield to closed-ring form. FIG. 36 shows the result.

Figure 37:
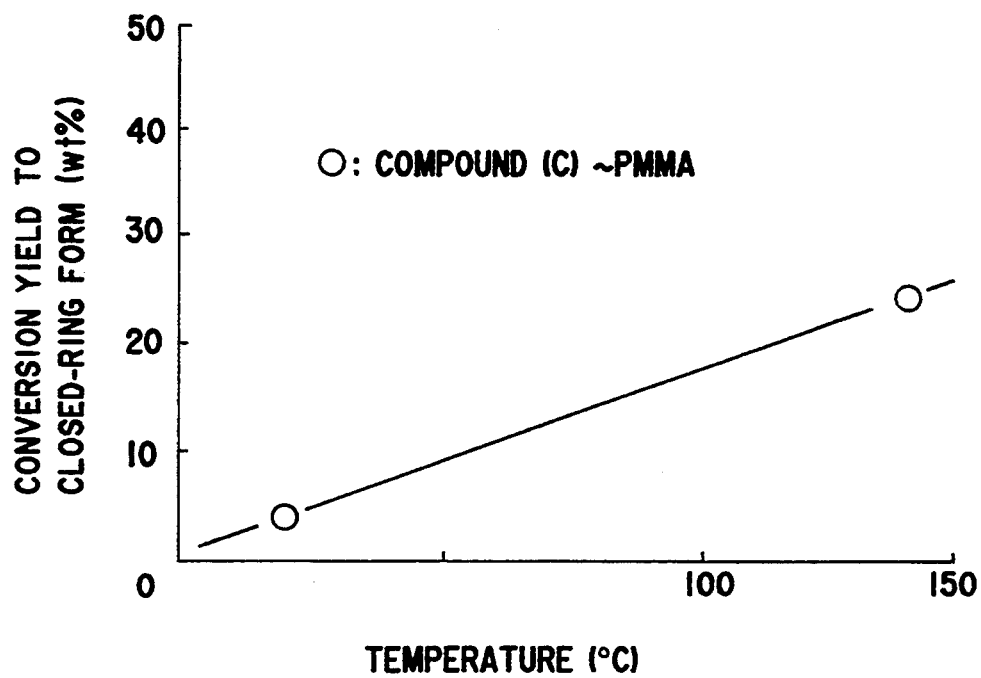
FIG. 37 illustrates temperature dependence of a conversion yield to closed-ring form in the photochromic compound according to Example 5 of the present invention in methyl polymethacrylate.

A sample similar to the above was prepared with PMMA (polymethyl methacrylate) in place of PS, and subjected to measurement of the conversion yield to closed-ring form. FIG. 37 shows the result.

Comparative Example 2

A comparative photochromic material was prepared from 2-(2-methylbenzo[b]thiophene-3-yl)-3-(1,2-dimethyl-3-indolyl) maleic anhydride expressed in the following formula:

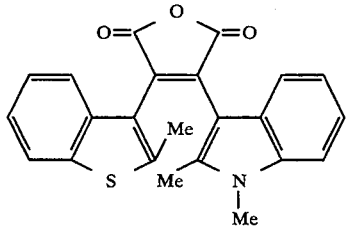

This photochromic compound is hereinafter referred to as a compound (comparative). In this compound (comparative), $R_1$ in the general formula (III) represents not an alkoxy group but a —$CH_3$ group, dissimilarly to the inventive photochromic compound. As to the remaining components, A represents an oxygen atom, $R_{10}$ and $R_{11}$ represent —$CH_3$ groups and $R_2$ to $R_9$ represent hydrogen atoms in the general formula (III).

Figure 39:
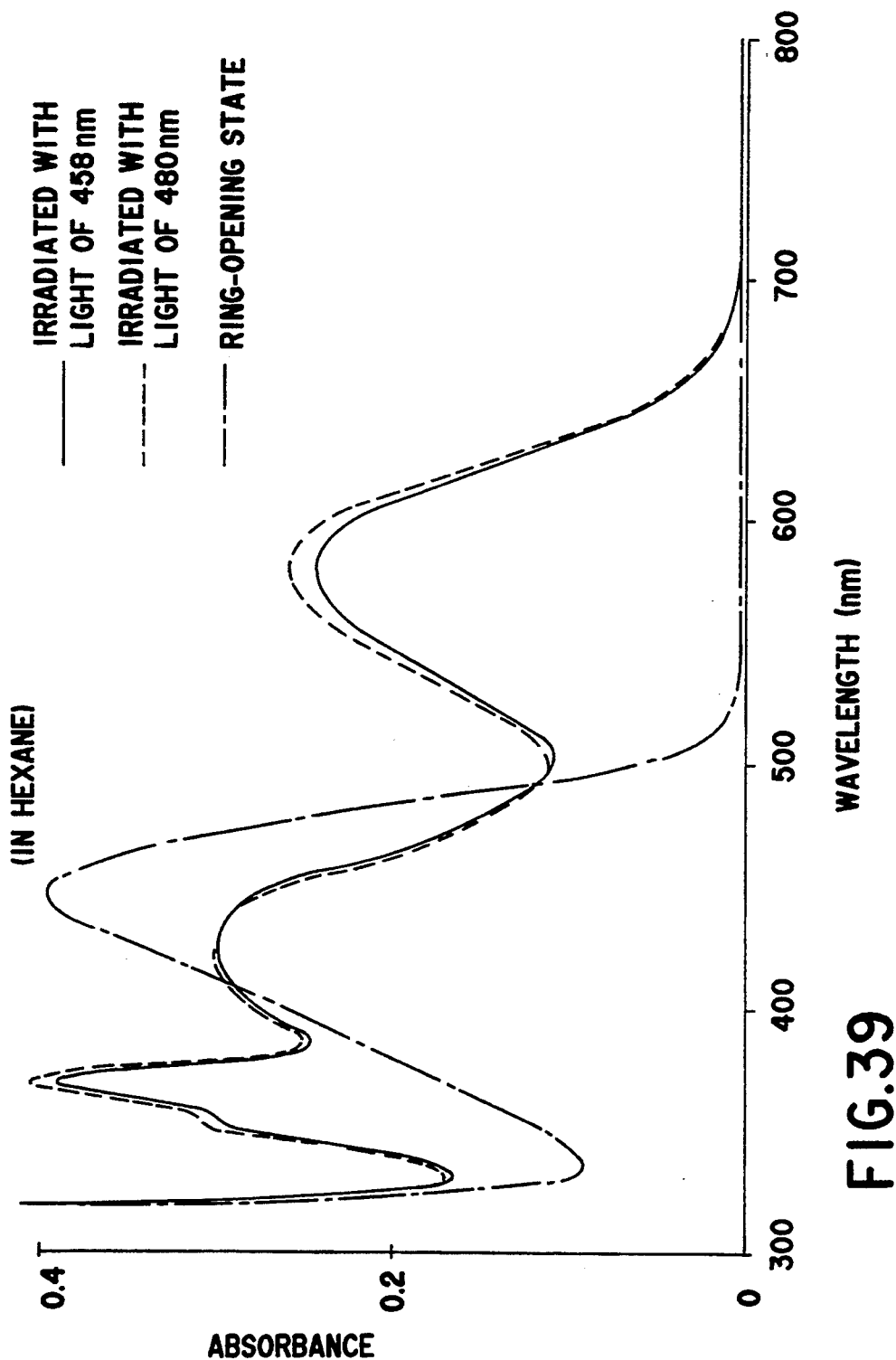
FIG. 39 illustrates absorption spectra of a photochromic compound according to Comparative Example 2.

This compound (comparative) was dissolved in hexane, and the as-obtained solution was charged in an optical cell to be subjected to measurement of absorption spectra. FIG. 39 shows the as-obtained absorption spectra. It is clearly understood from FIG. 39 that this compound (comparative) has high sensitivity in the vicinity a wavelength of 580 nm.

Then, samples Comparative-1 to Comparative-3 of optical recording mediums were prepared with recording layers containing the compound (comparative) and polystyrene (PS) having average molecular weight of 20,000. In order to prepare the recording layers of the optical recording mediums, the compound (comparative) and polystyrene were added to solvents of 100 g of dichloromethane in proportions shown in Table 7, and thereafter the solvents were evaporated.

TABLE 7

| Sample No. | Photochromic Compound | PS (g) | Mixing Ratio of Photochromic Compound (Comparative) to PS (wt %) |
|---|---|---|---|
| Comparative-1 | 0.1 | 10 | 1 |
| Comparative-2 | 0.5 | 10 | 5 |
| Comparative-3 | 1.0 | 10 | 10 |

The recording layer of each sample was irradiated with a beam of at least 546 nm in wavelength so that the photochromic compound contained therein was brought into a complete ring-opening state, for measurement of absorbance. It was possible to easily bring the photochromic compound into such a ring-opening state by irradiation with the beam of at least 546 nm in wavelength.

Then, the irradiated portion of the recording layer was irradiated with a beam of 458 nm in wavelength to be brought into a photostationary state, for measurement of absorbance. In this case, a conversion yield to closed-ring form was calculated on the basis of aforementioned method.

Figure 40:
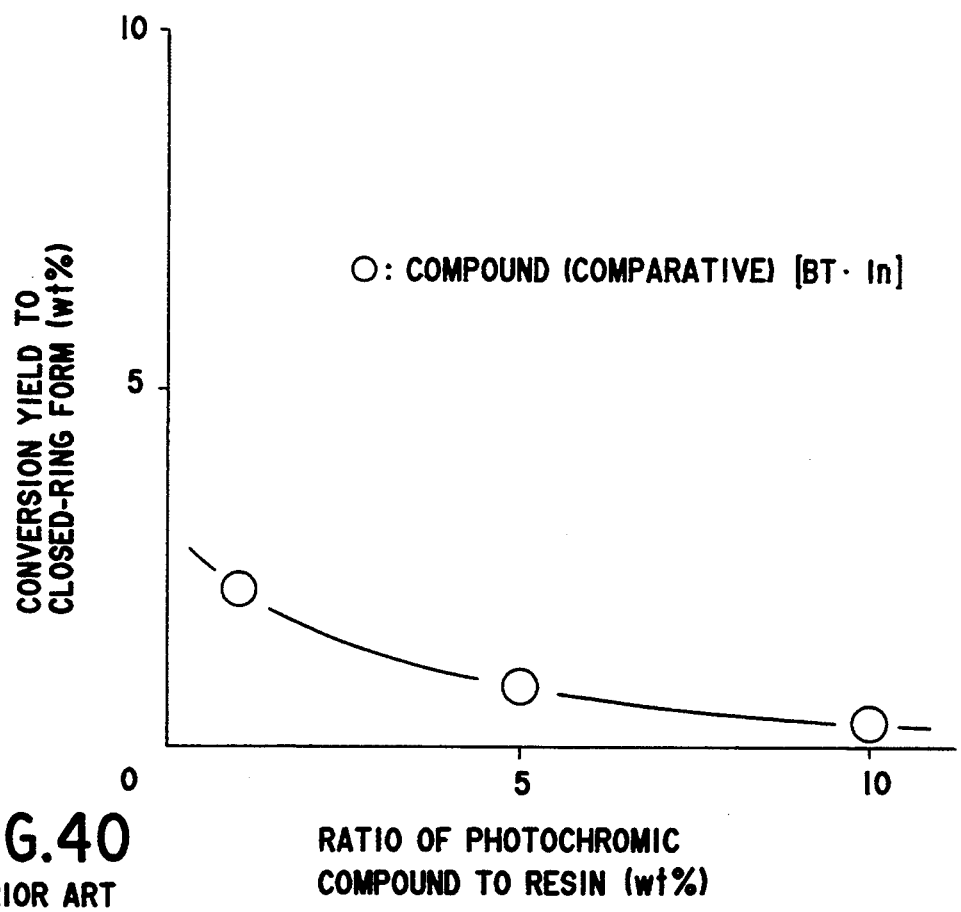
FIG. 40 illustrates concentration dependence of a conversion yield to closed-ring form in an optical recording material according to Comparative Example 2.

FIG. 40 shows the conversion yield to closed-ring form in each of the samples Comparative-1 to Comparative-3 which were irradiated with the beam of 458 nm in wavelength. The axis of ordinates shows the conversion yield to closed-ring form of the photochromic compound, and the axis of abscissas shows the weight mixing ratio of the photochromic compound with respect to PS as a ratio to resin.

Then the sample Comparative-1 was set on a heater of a prescribed temperature, irradiated with a beam of 458 nm in wavelength to be brought into a photostationary state, and thereafter cooled to the room temperature, for measurement of absorbance. Temperature dependence of the current conversion yield to closed-ring form was obtained.

Figure 41:
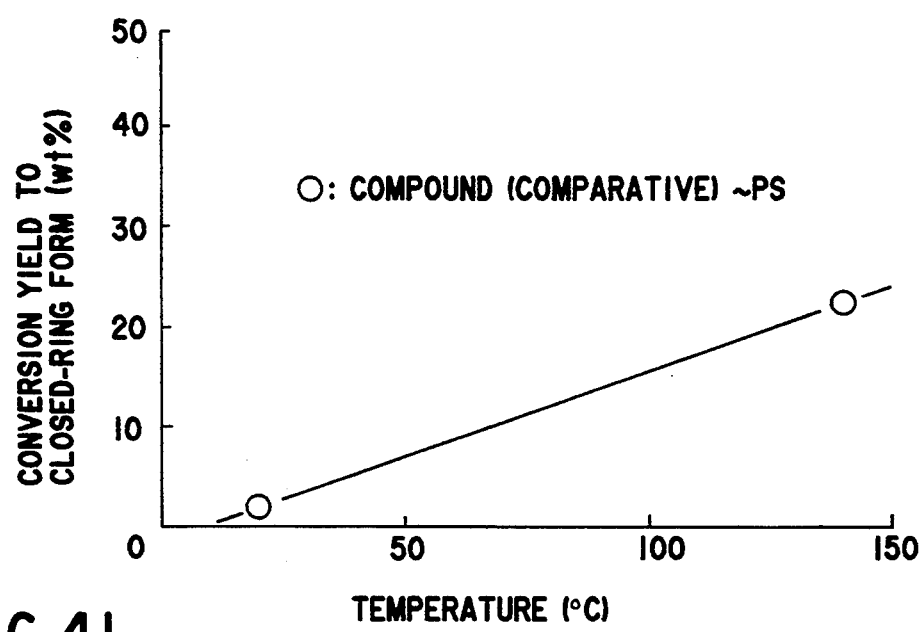
FIG. 41 illustrates temperature dependence of a conversion yield to closed-ring form in the photochromic compound according to Comparative Example 2 in polystyrene.
Figure 42:
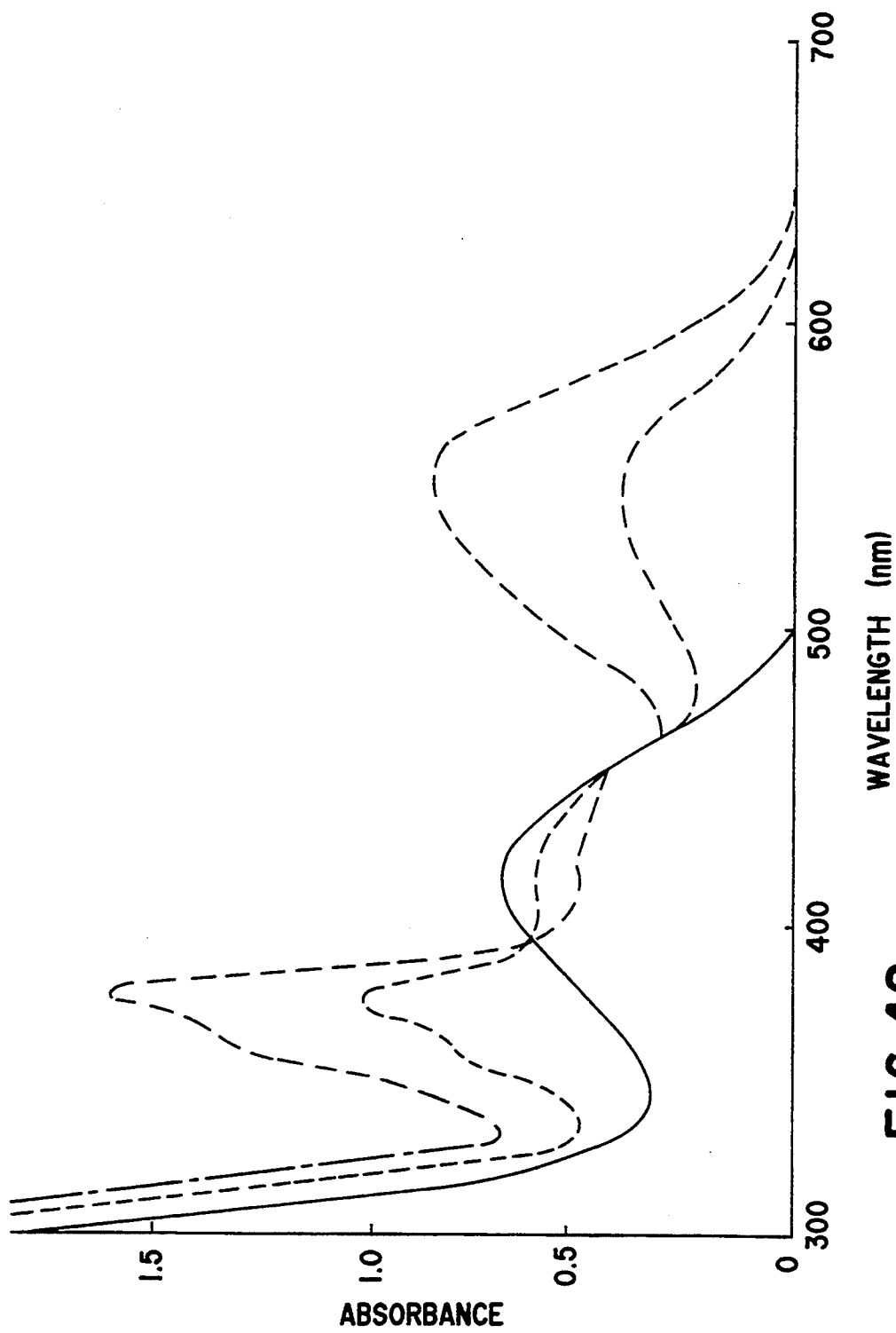
FIG. 42 illustrates absorption spectra of a conventional photochromic compound.
Figure 43:
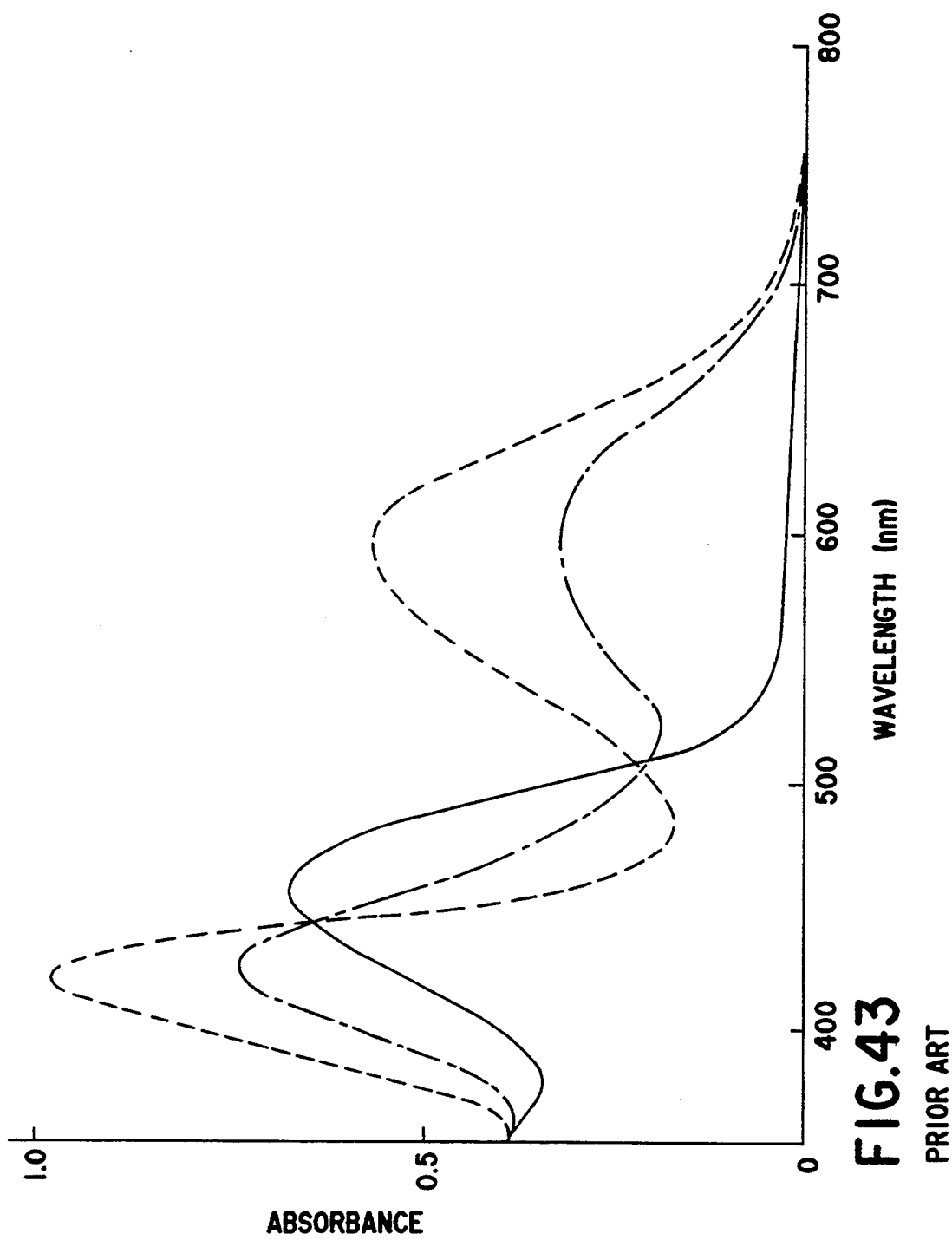
FIG. 43 illustrates absorption spectra of another conventional photochromic compound.

FIG. 41 shows the as-obtained temperature dependence of the conversion yield to closed-ring form. The axis of ordinates shows the conversion yield to closed-ring form of the photochromic compound, and the axis of abscissas shows the temperature.

As clearly understood From FIG. 41, this film was substantially unchanged at the room temperature, and exhibited no specific change at a temperature of 140° C. The temperature dependence of this compound (comparative) is obviously smaller than that of the aforementioned compound (C), and it is difficult to perform nondestructive reading by simultaneous irradiation with two beams of wavelengths.

EXAMPLE 6

Description is now made on Example 6, which was formed by preparing $R_{10}$ in the above general formula (III) from an alkyl group having a carbon number of at least 4 in order to improve solubility in an organic solvent as to the photochromic compound according to the second aspect of the present invention.

An example of such a photochromic material, which is expressed in the above general formula (III), where A represents an oxygen atom, $R_1$ represents a —$OCH_3$ group, $R_{10}$ represents an n-$C_4H_9$ group, $R_{11}$ represents a —$CH_3$ group and $R_2$ to $R_9$ represent hydrogen atoms, is 2-(2-methoxybenzo[b]thiophene-3-yl)-3-(1-butyl-2-methyl-3-indolyl) maleic anhydride expressed in the following formula:

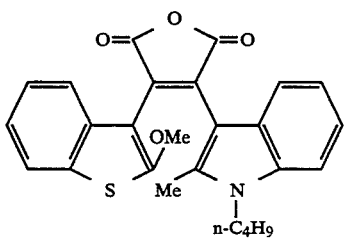

This photochromic compound is hereinafter referred to as a compound (D).

Solubility of this compound (D) in a hexane solution was investigated. Table 8 shows the result.

EXAMPLE 7

Description is now made on Example 7 having excellent solubility with respect to an organic solvent, similarly to Example 6. An example of such a compound, which is expressed in the above general formula (III), where $R_{10}$ represents an n-$C_8H_{17}$ group, is 2-(2-methoxybenzo[b]thiophene-3-yl)-3-(1-octyl-2-methyl-3-indolyl) maleic anhydride. As to the remaining components of this photochromic compound, A represents an oxygen atom, $R_1$ represents a —$OCH_3$ group, $R_{11}$ represents a —$CH_3$ group and $R_2$ to $E_9$ represent hydrogen atoms in the above general formula (III). This photochromic compound, expressed in the following formula, is hereinafter referred to as a compound (E).

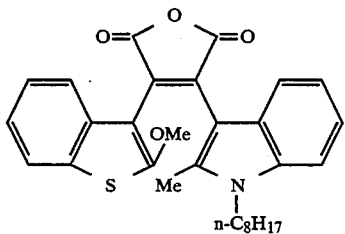

Solubility of this compound (E) in a hexane solution was investigated. Table 8 also shows the result.

For the purpose of comparison, solubility of the compound (A) according to Example 3 was also investigated. Table 8 also shows the result.

TABLE 8

|  | Molecular Structure | $R_{10}$ | Solubility |
| --- | --- | --- | --- |
| Example 4 | Compound (D) | —$C_4H_9$ | $2.2 \times 10^{-2}$ |
| Example 5 | Compound (E) | —$C_8H_{17}$ | $4.3 \times 10^{-1}$ |
| Example 1 | Compound (A) | —$CH_3$ | $1.4 \times 10^{-3}$ |

As clearly understood from Table 8, solubility of the inventive photochromic compound is remarkably improved when $R_{10}$ in the general formula (III) is prepared from a long-chain alkyl group having a carbon number of at least 4 such as —$C_4H_9$ or —$C_8H_{17}$.

Description is now made on Examples of compounds according to the present invention, which are particularly excellent in durability against repetitive coloring-/decoloring under presence of air. Such compounds include that containing an alkoxy group having a carbon number of at least 2 as $R_1$ in the general formula (III) and that containing a cyano group as $R_7$ in the general formula (II).

Further, when $R_6$ and $R_7$ in the general formula (II) form parts of a benzene ring to constitute a benzothiophene ring, the compound exhibits excellent durability against repetition also when $R_1$ is prepared from a methoxy group.

EXAMPLE 8

A compound (F) having the following structural formula was mixed/dissolved in a solvent of hexane, and the as-obtained solution was charged in an optical cell. This optical cell was irradiated with a beam of 436 nm in wavelength, serving as coloring light, until the compound entered a photostationary state by at least 90%. As to decoloring, the optical cell was irradiated with a beam of at least 546 nm in wavelength until the as-colored compound entered a 100% ring-opening state. A cycle off such coloring and decoloring was repeated under presence of air to measure absorbance at the maximal absorption wavelength in the colored state. The repeatable frequency was measured when the absorbance reached 80% of initial absorbance.

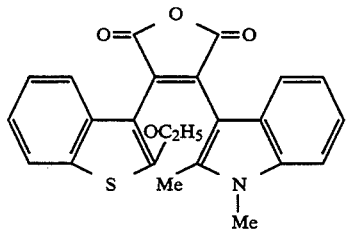

Figure 44:
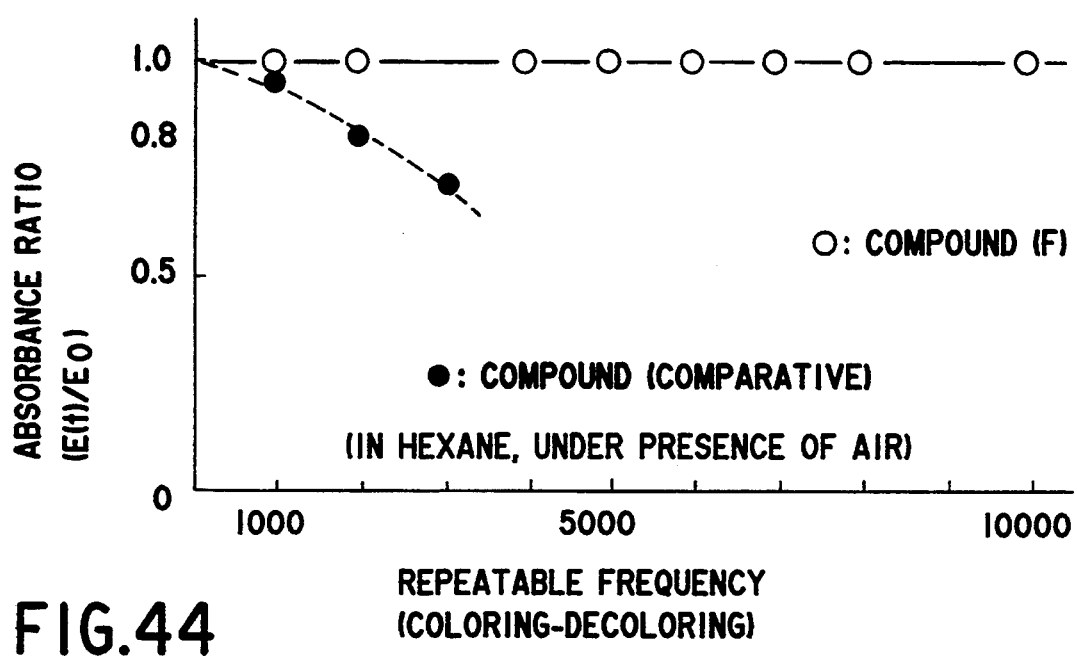
FIG. 44 illustrates a repeatable frequency of coloring/decoloring in a photochromic compound according to Example 8 of the present invention.

For the purpose of comparison, the compound (comparative) according to Comparative Example 2 was also subjected to measurement of a repeatable frequency. FIG. 44 shows the results. As clearly understood from FIG. 44, the compound (comparative) exhibited a repeatable frequency of only 2000 times, while the compound (F) according to the present invention substantially maintained the initial absorbance also when the repeatable frequency reached 10,000 times.

EXAMPLE 9

Figure 45:
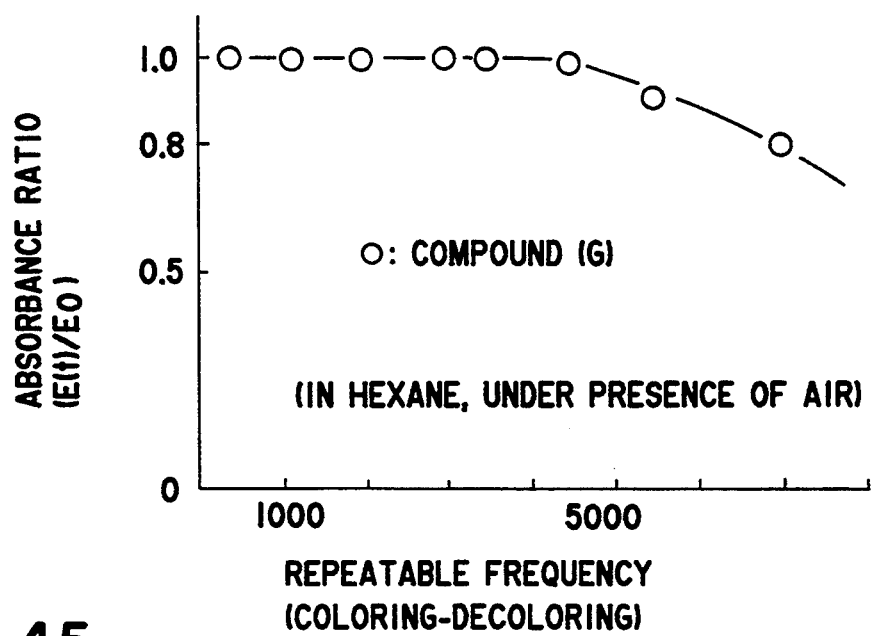
FIG. 45 illustrates a repeatable frequency of coloring/decoloring in a photochromic compound according to Example 9 of the present invention.

A compound (G) having the following structural formula was also subjected to measurement of a repeatable frequency, similarly to Example 8. FIG. 45 shows the result. As shown in FIG. 45, this compound (G) exhibited a repeatable frequency of 7000 times.

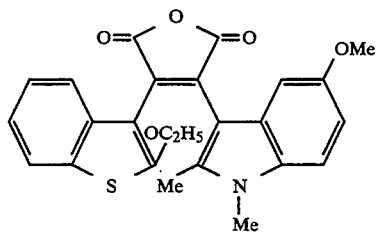

EXAMPLE 10

Figure 46:
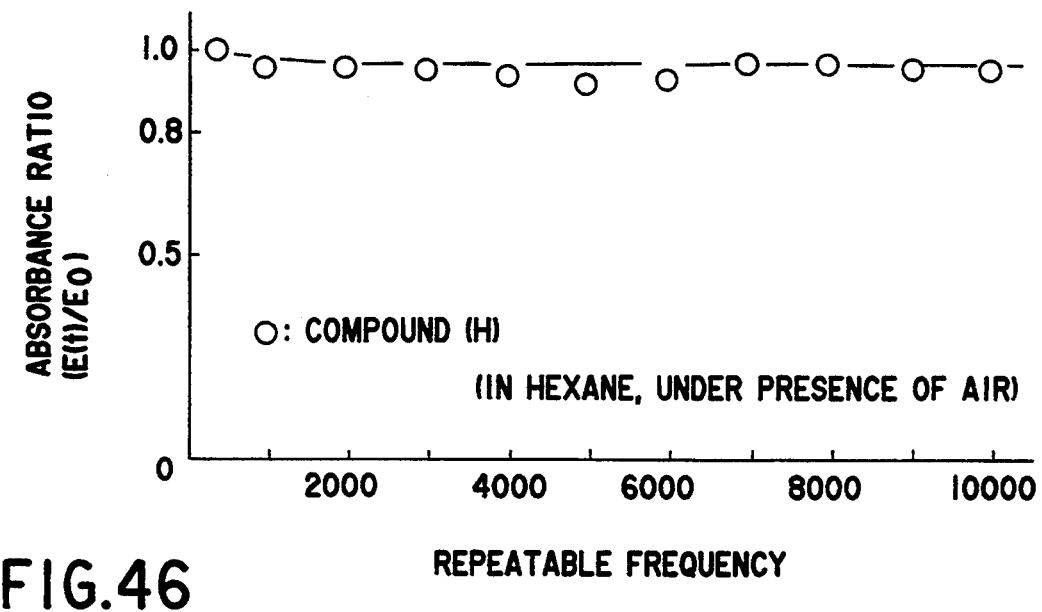

A compound (H) having the following structural formula was also subjected to measurement of a repeatable frequency, similarly to Example 8. FIG. 46 shows the result. As shown in FIG. 46, this compound (H) substantially maintained initial absorbance also when the repeatable frequency reached 10000 times.

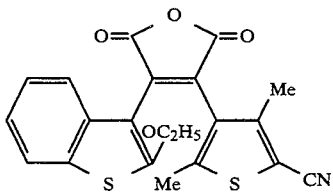

EXAMPLE 11

Figure 47:
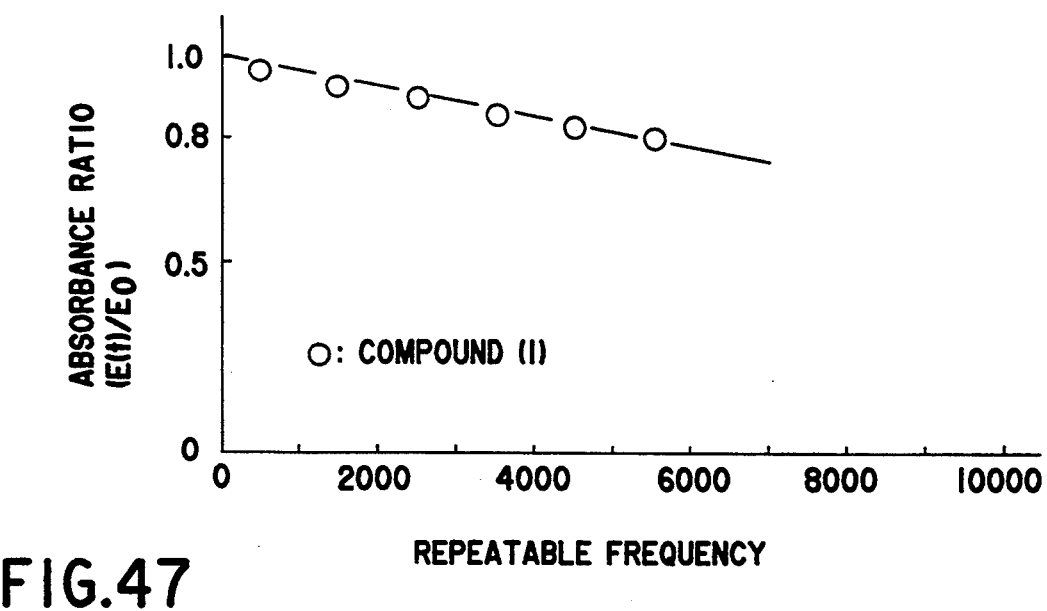
FIG. 47 illustrates a repeatable frequency of coloring/decoloring in a photochromic compound according to Example 11 of the present invention.

A compound (I) having the following structural formula wherein R₁ is an isopropoxy group was also subjected to measurement of a repeatable frequency, similarly to Example 8. FIG. 47 shows the result. As shown in FIG. 47, this compound (I) substantially maintained initial absorbance also when the repeatable frequency reached about 5500 times.

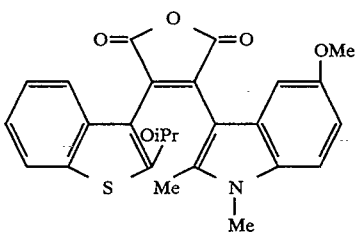

EXAMPLE 12

Figure 48:
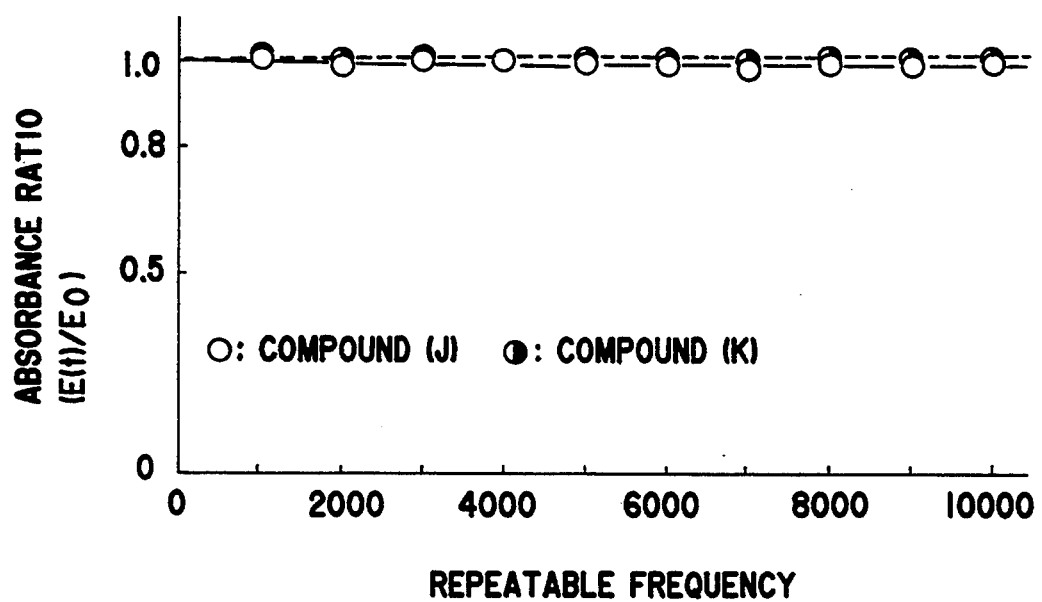
FIG. 48 illustrates a repeatable frequency of coloring/decoloring in a photochromic compound according to Example 12 of the present invention.

Compounds (J) and (K) having the following structural formulas were also subjected to measurement of repeatable frequencies, similarly to Example 8. FIG. 48 shows the results. As shown in FIG. 48, each of these compounds (J) and (K) substantially maintained initial absorbance also when the repeatable frequency reached 10000 times.

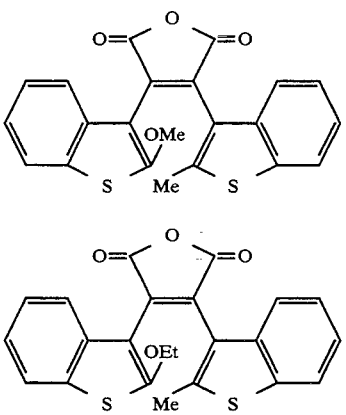

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical recording material containing a photochromic compound being expressed in the following general formula (I):

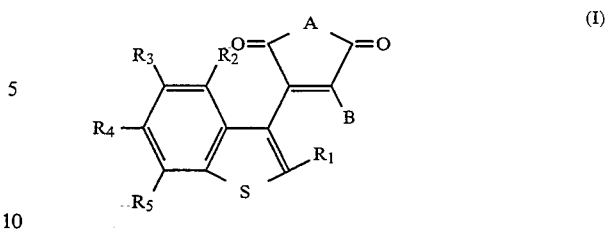

where A represents an oxygen atom or a nitrogen atom, $R_1$ represents an alkoxy group, $R_2$ to $R_5$ represent atoms or groups selected from a group of a hydrogen atom, a halogen atom, a hydroxy group, an alkyl group, an alkoxy group, a cyano group, a nitro group, an alkylcarbonyl group, an alkoxycarbonyl group, a perfluoroalkyl group, an aryl group, a cycloalkyl group, an arylcarbonyl group, an aryloxycarbonyl group, a mono- or dialkylaminocarbonyl group, an alkylcarbonyloxy group, an arylcarbonyloxy group, an aryloxy group, an alkoxycarbonyloxy group and an aryloxycarbonyloxy group respectively, and B represents a thiophene ring, benzothiophene ring, pyrrole ring or indole ring.

2. An optical recording medium comprising:
   a recording layer containing an optical recording material in accordance with claim 1 and a polymer component;
   a reflective layer for reflecting light passing through said recording layer; and
   a substrate for supporting a laminate structure of said recording layer and said reflective layer.

3. An optical recording material in accordance with claim 1, containing a photochromic compound being expressed in the following general formula (II):

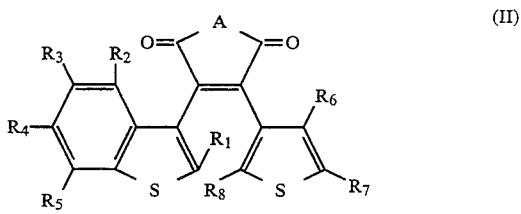

where A represents an oxygen atom or a nitrogen atom, $R_1$ represents an alkoxy group, and $R_2$ to $R_8$ represent atoms or groups selected from a group of a hydrogen atom, a halogen atom, a hydroxy group, an alkyl group, an alkoxy group, a cyano group, a nitro group, an alkylcarbonyl group, an alkoxycarbonyl group, a perfluoroalkyl group, an aryl group, an cycloalkyl group, an arylcarbonyl group, an aryloxycarbonyl group, a mono- or dialkylaminocarbonyl group, an alkylcarbonyloxy group, an arylcarbonyloxy group, an aryloxy group, an alkoxycarbonyloxy group and an aryloxycarbonyloxy group respectively, while $R_6$ and $R_7$ may form parts of a benzene ring to constitute a benzothiophene ring.

4. An optical recording material in accordance with claim 3, wherein $R_1$ in said general formula (II) is a methoxy group (—OCH₃ group).

5. An optical recording material in accordance with claim 3, wherein $R_1$ in said general formula (II) is an alkoxy group (—OC$_n$H$_{2n+1}$ group; $n \geq 2$) having a carbon number of at least 2.

6. An optical recording material in accordance with claim 3, wherein $R_1$ in said general formula (II) is an ethoxy group (—OC₂H₅ group).

7. An optical recording material in accordance with claim 3, wherein $R_1$ in said general formula (II) is a propoxy group (—$OC_3H_7$ group).

8. An optical recording material in accordance with claim 3, containing a photochromic compound being expressed in the following general formula:

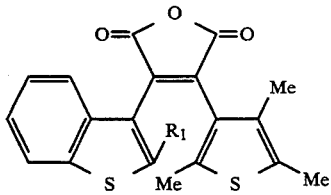

wherein $R_1$ is the same as defined above.

9. An optical recording material in accordance with claim 3, containing a photochromic compound being expressed in the following general formula:

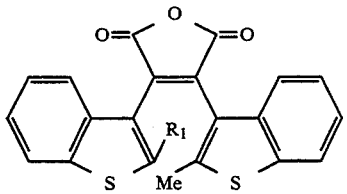

wherein $R_1$ is the same as defined above.

10. An optical recording material in accordance with claim 3, wherein $R_7$ in said general formula (II) is a cyano group.

11. An optical recording material in accordance with claim 10, containing a photochromic compound being expressed in the following general formula:

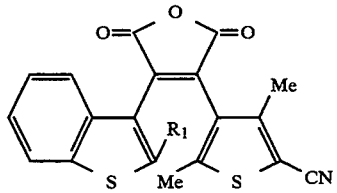

wherein $R_1$ is the same as defined above.

12. An optical recording material in accordance with claim 1, containing a photochromic compound being expressed in the following general formula (III):

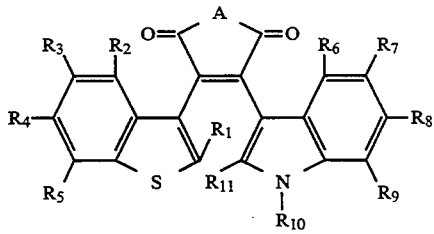

(III)

where A represents an oxygen atom or a nitrogen atom, $R_1$ represents an alkoxy group, and $R_2$ to $R_{11}$ represent atoms or groups selected from a group of a hydrogen atom, a halogen atom, a hydroxy group, an alkyl group, an alkoxy group, a cyano group, a nitro group, an alkylcarbonyl group, an alkoxycarbonyl group, a perfluoroalkyl group, an aryl group, a cycloalkyl group, an arylcarbonyl group, an aryloxycarbonyl group, a mono- or dialkylaminocarbonyl group, an alkylcarbonyloxy group, an arylcarbonyloxy group, an aryloxy group, an alkoxycarbonyloxy group and an aryloxycarbonyloxy group respectively, while said photochromic material may be bonded with a polymer as a side chain in the position of A or N of N—$R_{10}$ in said formula.

13. An optical recording material in accordance with claim 12, wherein $R_1$ in said general formula (III) is a methoxy group (—$OCH_3$ group).

14. An optical recording material in accordance with claim 12, wherein $R_1$ in said general formula (III) is an alkoxy group (—$OC_nH_{2n+1}$ group; $n \geq 2$) having a carbon number of at least 2.

15. An optical recording material in accordance with claim 12, wherein $R_1$ in said general formula (III) is an ethoxy group (—$OC_2H_5$ group).

16. An optical recording material in accordance with claim 12, wherein $R_1$ in said general formula (III) is a propoxy group (—$OC_3H_7$ group).

17. An optical recording material in accordance with claim 12, containing a photochromic compound being expressed in the following general formula:

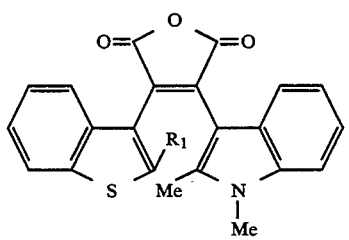

wherein $R_1$ is the same as defined above.

18. An optical recording material in accordance with claim 17, wherein $R_1$ in said general formula is an ethoxy group (—$OC_2H_5$ group).

19. An optical recording material in accordance with claim 12, wherein $R_7$ in said general formula (III) is an alkoxy group.

20. An optical recording material in accordance with claim 19, wherein $R_7$ in said general formula (III) is a methoxy group (—$OCH_3$ group).

21. An optical recording material in accordance with claim 19, containing a photochromic compound being expressed in the following general formula:

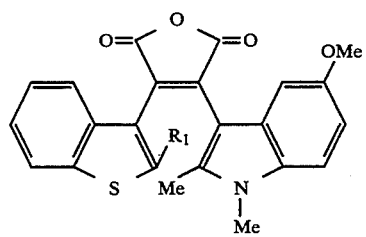

wherein $R_1$ is the same as defined above.

22. An optical recording material in accordance with claim 21, wherein $R_1$ in said general formula is an ethoxy group (—$OC_2H_5$ group).

23. An optical recording material in accordance with claim 12, wherein $R_{10}$ in said general formula (III) is an alkyl group having a carbon number of at least 4.

24. An optical recording material in accordance with claim 23, containing a photochromic compound being expressed in the following general formula:

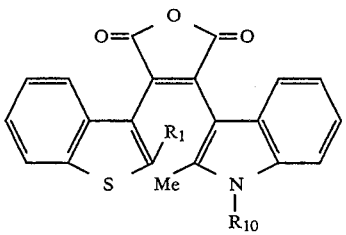

wherein $R_1$ is the same as defined above and $R_{10}=C_nH_{2n+1}$, where $n \geq 4$.

25. An optical recording material in accordance with claim 24, wherein $R_1$ and $R_{10}$ in said general formula are a methoxy group (—$OCH_3$ group) and an n-$C_4H_9$ group respectively.

26. An optical recording material in accordance with claim 24, wherein $R_1$ and $R_{10}$ in said general formula are a methoxy group (—$OCH_3$ group) and an n-$C_8H_{17}$ group respectively.

* * * * *

UNITED STATES PATENT AND TRADEMARK OFFICE
CERTIFICATE OF CORRECTION

PATENT NO. : 5,443,940
DATED : August 22, 1995
INVENTOR(S) : Tatezono et al

It is certified that error appears in the above-indentified patent and that said Letters Patent is hereby corrected as shown below:

On the title page:   Item [73], add the second assignee -- Masahiro Irie, Fukuoka -- between Sanyo Electric Co., Ltd., Osaka and Kobe Natural Products & Chemicals Co., Ltd., Kobe, all of Japan.

Signed and Sealed this

Fifth Day of March, 1996

Attest:

BRUCE LEHMAN

Attesting Officer    Commissioner of Patents and Trademarks